(12) United States Patent
Costabel

(10) Patent No.: US 6,476,804 B1
(45) Date of Patent: Nov. 5, 2002

(54) SYSTEM AND METHOD FOR GENERATING COMPUTER ANIMATED GRAPHICAL IMAGES OF AN EXTERIOR PATCH SURFACE LAYER OF MATERIAL STRETCHING OVER AN UNDERSTRUCTURE

(75) Inventor: Paolo Costabel, Culver City, CA (US)

(73) Assignees: Sony Corporation, Tokyo (JP); Sony Pictures Entertainment, Culver City, CA (US)

( * ) Notice: Subject to any disclaimer, the term of this patent is extended or adjusted under 35 U.S.C. 154(b) by 326 days.

(21) Appl. No.: 09/620,344

(22) Filed: Jul. 20, 2000

(51) Int. Cl.[7] .............................................. G06T 17/00
(52) U.S. Cl. ........................ 345/419; 345/420; 345/646; 345/647; 345/473
(58) Field of Search ................................. 345/419, 420, 345/423–427, 582, 619, 646–648, 473

(56) References Cited

PUBLICATIONS

Wilhelms, "Animals with Anatomy", IEEE Computer Graphics and Applications, 17(3):May 22–30, 1997.*
Wilhelms, et al., "Anatomically Based Modeling", *Computer Graphics Proceedings*, Annual Conference Series, 1997.

* cited by examiner

*Primary Examiner*—Almis R. Jankus
(74) *Attorney, Agent, or Firm*—Haverstock & Owens LLP

(57) ABSTRACT

A process for generating animated graphical images of an exterior patch surface of an exterior layer disposed over an animated underlying structure includes the steps of: generating and arranging a plurality of underlying patches each being in a rest position to form an underlying patch surface representing an underlying structure disposed in a rest position; generating and arranging a plurality of exterior patches to form an exterior patch surface superimposed over the underlying structure in the rest position, each of the exterior patches having an associated array of control points; transforming the control points of the exterior patches into a polygonal mesh of vertex points each being coincident with at least one of the control points; establishing a binding positional relationship between each of the vertex points and an associated closest one of the underlying patches to the vertex point; animating the underlying structure causing a displacement in the position of at least one of the underlying patches relative to the rest positions of the underlying patches, and resulting in a deformed underlying structure; moving at least a portion of the vertex points based on the associated binding positional relationships and displacements in the positions of the associated closest underlying patches; and generating a plurality of reconstructed exterior patches each having an array of control points at least some of which are coincident with relaxed positions of associated ones of the vertex points of the polygonal mesh, the reconstructed exterior patches defining a deformed exterior patch surface superimposed over the deformed underlying structure.

58 Claims, 11 Drawing Sheets

| VERTEX POINTS | BINDING INFORMATION | | |
|---|---|---|---|
| | PATCH | BINDING POINT (u,v) | COORDINATES OF ANCHOR POINT (x,y,z) |
| | | | |
| | | | |
| | | | |
| | | | |

SYSTEM AND METHOD FOR GENERATING COMPUTER ANIMATED GRAPHICAL IMAGES OF AN EXTERIOR PATCH SURFACE LAYER OF MATERIAL STRETCHING OVER AN UNDERSTRUCTURE

BACKGROUND OF THE INVENTION

1. Field of the Invention

The present invention relates generally to the field of computer animation. More particularly, the present invention relates to a system and method for generating computer animated graphical images of an exterior layer of material stretching over an underlying structure.

2. Description of the Prior Art

Generating realistic computer animated images of animal bodies, including human bodies, is a difficult task. Such images are extremely complex due to the fine anatomical details of the animal bodies, and also due to the quick and subtle changes in the images as muscles and other anatomical structures move, flex, and deform under skin. Nevertheless, a continuing goal of computer animators is to achieve ever greater realism in creating computer animated images of animal bodies.

Advances in generating realistic computer animated images of animal bodies have been achieved by developing animation methods that take into account and simulate the physical behavior of the various anatomical structures of the animal bodies. In real animals, the moving anatomical elements cause widespread movements of the overlying skin. Anatomically Based Modeling is discussed in detail in an article of the same name written by Jane Wilhelms and Allen Van Gelder of the University of California, Santa Cruz, and published in Computer Graphics Proceedings, Annual Conference Series, 1997. The reference provides a methodology for skin deformation in response to deformation of underlying anatomical elements. Individual anatomical elements such as bones, muscles, and generalized tissue are modeled as triangle meshes or ellipsoids. Skin overlying the anatomical elements is modeled by a triangle-mesh of skin vertices which is attached to the underlying anatomical elements by anchors.

The anatomically based modeling process described by Wilhelms and Van Gelder includes the steps of: defining springs between associated skin vertexes of the triangle-mesh skin; binding each skin vertex with a closest underlying body component (muscle, bone, or generalized tissue) in accordance with an anchoring method; animating the underlying body causing the underlying body components to be moved; moving the skin vertexes of the triangle-mesh skin based on the movement of the body components and the anchoring, the movement causing corresponding springs to deform and therefore exert restoring forces on the skin vertexes; and resolving the spring forces during a relaxation phase of the process. The springs, which are mathematical functions defining a potential force between the associated vertices as a function of the distance therebetween, provide for achieving a natural elasticity in the skin as it stretches over the animated understructure.

Wilhelms and Van Gelder define an anchor of a particular skin vertex to be the nearest point on its underling component. A virtual anchor, defined as the initial position of a skin vertex relative to its underlying component, is the position of the vertex when the skin is extracted in the animal's rest position. The anchors and virtual anchors are stored parameterized in the local space of the component. As shape changes occur in the underlying components, the skin vertices are correspondingly affected via the anchors and virtual anchors. Each skin vertex is considered to be connected to its virtual anchor by a spring of rest length zero, and a specified spring stiffness. To anchor the skin to triangle-mesh bones, skin vertices are converted into the coordinate system of the bone and scaled by the size of its bounding box in each dimension.

One problem associated with the anatomically based modeling process described by Wilhelms and Van Gelder is that the layer of skin is modeled using a triangle mesh of vertices as described above. Polygonal models such as a triangle mesh of vertices are useful primarily for representing objects having flat surfaces, but fall short in allowing the degree of flexibility required for representing curved bodies having complex details. By contrast, parametric surfaces afford great flexibility by providing modelers with intuitive control parameters that make manipulating them fairly natural. Many different types of parametric surfaces, or patches, are commonly used by modelers for representing curved surfaces. One type of parametric surface commonly used by modelers is the non-uniform rational B-spline surface (NURBS) patch. A NURBS patch has an associated resolution defined by an associated number of control vertex (CV) points which are arranged in an array and which provide a "control hull" of the patch.

In order to achieve greater realism in computer animated images, it is desirable to be able to model an exterior layer of material (e.g., animal skin, human skin, or clothing) using parametric surfaces which provide a high degree of flexibility. Using patches, a modeler of the exterior patch surface may select a resolution for each patch based on the detail of the associated area of the body. As an example, a modeler may want to use a minimal number of exterior CV points to define a large flat region of the body (e.g., the stomach area) in order to conserve the number of CV points for purposes of conserving processing power required to execute the overall animation processes. The goal of the modeler is to maximize the image quality of the exterior patch surface while minimizing the processing power required for animation. Note also that a modeler may need to use a large number of CV points to define a particularly detailed region of the body (e.g., a human or animal face).

It would be desirable to provide an anatomically based modeling process having the advantages of the process described by Wilhelms and Van Gelder, but using a parametric surface model for the exterior skin, wherein the parametric surface is formed by a plurality of patches some of which have different resolutions defined by a different number of CV points. However, a problem arises in defining springs between CV points of adjacent pairs of patches having different resolutions because the lengths of these springs vary, and this variation in spring lengths causes unwanted results during the relaxation phase of the movement process which includes resolving the forces exerted by the springs. More specifically, the defining of springs between CV points of adjacent patches having different resolutions creates problems of cracks, seams, and other undesirable artifacts.

What is needed is a system and method for generating realistic animated graphical images of an exterior layer of material stretching over an animated underlying structure, wherein the exterior layer is modeled by parametric surface patches having varying resolutions, and wherein the exterior layer may have an elastic quality.

SUMMARY OF THE INVENTION

It is an object of the present invention to provide a system and method for generating realistic animated graphical images of an exterior layer of material stretching over an animated underlying structure, wherein the exterior layer is modeled by parametric surface patches having varying resolutions, and wherein the exterior layer may have an elastic quality.

Briefly, a presently preferred embodiment of the present invention provides a system and process for generating animated graphical images of an exterior patch surface of an exterior layer of material stretching over an underlying structure. In one embodiment, the underlying structure is an anatomical structure, and the exterior layer is a layer of skin stretching over the anatomical structure. The process includes the steps of: generating and arranging a plurality of underlying patches each being in a rest position to form an underlying patch surface representing an underlying structure disposed in a rest position; and generating and arranging a plurality of exterior patches to form an exterior patch surface superimposed over the underlying structure in the rest position, each of the exterior patches having an associated array of control points. Note that a portion of the exterior patches may have varying resolutions defined by the number of control points in the associated arrays.

The process also includes the steps of: transforming the control points of the exterior patches into a polygonal mesh of vertex points each being coincident with at least one of the control points, at least one pair of the vertex points being associated with a spring defining a potential force therebetween; establishing a binding positional relationship between each of the vertex points and an associated closest one of the underlying patches to the vertex point; animating the underlying structure causing a displacement in the position of at least one of the underlying patches relative to the rest positions of the underlying patches, and resulting in a deformed underlying structure; moving at least a portion of the vertex points based on the associated binding positional relationships and displacements in the positions of the associated closest underlying patches, the moving of the vertex points deforming at least a portion of the springs resulting in spring restoring forces being exerted on associated vertex points; computing and resolving the spring restoring forces to determine a relaxed position for each of the vertex points of the polygonal mesh; and generating a plurality of deformed exterior patches each having an array of control points at least some of which are coincident with relaxed positions of associated ones of the vertex points of the polygonal mesh, the reconstructed exterior patches defining a deformed exterior patch surface superimposed over the deformed underlying structure.

The step of establishing a binding positional relationship between each of the vertex points and the associated closest underlying patch in the rest position further includes: determining a binding point associated with each of the vertex points, each binding point being located at a closest point to the associated vertex point on the surface of the associated closest underlying patch; and determining an anchor point associated with each of the vertex points, each anchor point defining the location of the associated vertex point relative to its associated binding point with the associated closest underlying patch being disposed in the rest position.

In one embodiment, each of the underlying patches is a non-uniform rational B-spline (NURBS) patch having a (u,v) coordinate system defining a u-direction and a v-direction relative to the NURBS patch. In this embodiment, the step of determining an anchor point associated with each of the vertex points further includes: determining a normal vector that is normal to the surface of the associated closest underlying patch at the associated binding point; determining a u-tangent to the surface of the associated closest underlying patch along the u-direction at the associated binding point; determining a v-tangent to the surface of the associated closest underlying patch along the v-direction at the associated binding point, the normal vector, the u-tangent, and the v-tangent defining a reference coordinate system for the associated anchor point; and defining the position of the anchor point relative to the binding point using the reference coordinate system of the associated closest underlying patch. The normal vector is defined in world space which is independent of the coordinate spaces of the patches.

An important advantage of the system and method of the present invention is that it provides for generating high quality graphical images of an exterior layer of material stretching over animated underlying components, wherein the exterior topology is formed by parametric surface patches having varying resolutions. The ability to model the exterior topology using patches having varying resolution allows for minimizing the processing power required to generate a high quality image by maximizing patch resolutions in portions of the exterior layer having highly detailed contours and minimizing patch resolutions in portions of the exterior layer having less detailed contours.

The foregoing and other objects, features, and advantages of the present invention will be apparent from the following detailed description of the preferred embodiment which makes reference to the several figures of the drawing.

IN THE DRAWING

Figures 11, 12:
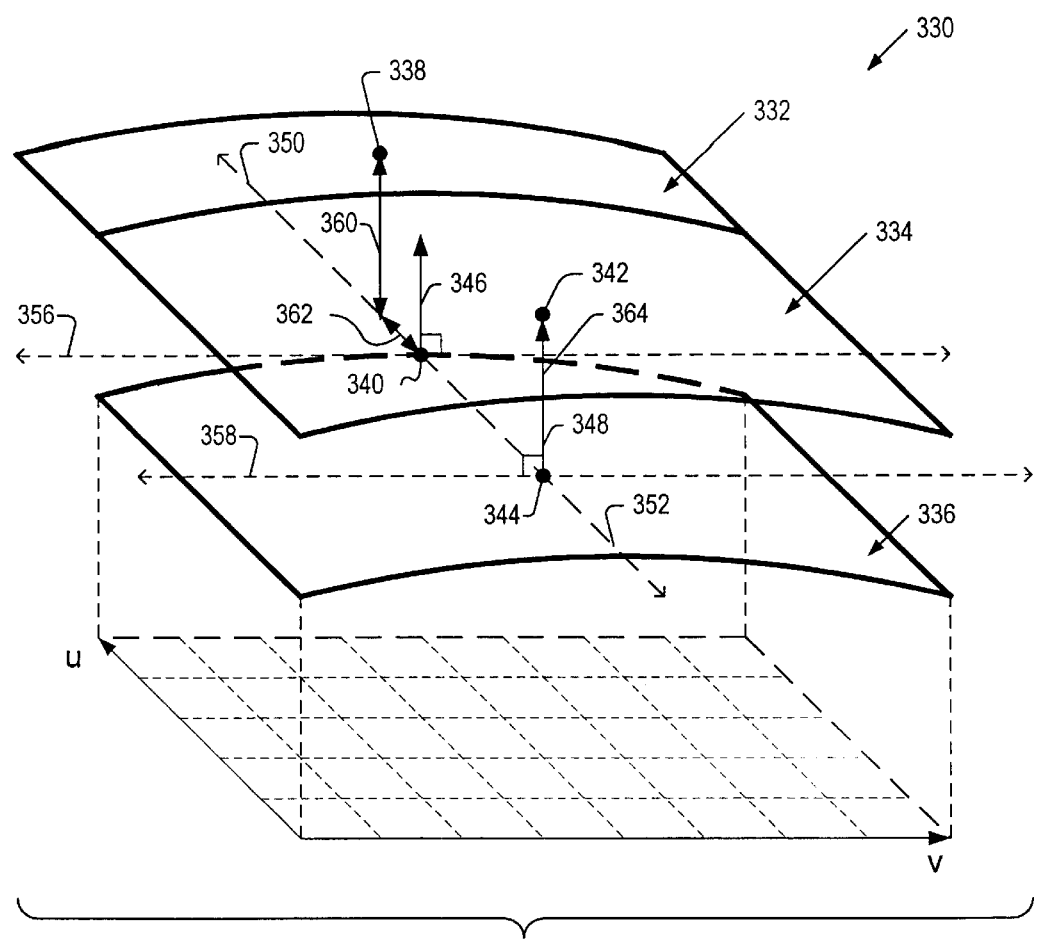

FIG. 11 is a perspective view of a pair of exterior patches disposed proximate an associated closest underlying patch, the view illustrating binding positional relationships between vertex points of the polygonal mesh and the associated closest underlying patch; and FIG. 12 is a table diagram generally illustrating binding mapping information generated based on the binding positional relationships between vertex points of the polygonal mesh and associated closest underlying patches.

DETAILED DESCRIPTION OF THE PREFERRED EMBODIMENTS

Figure 1:
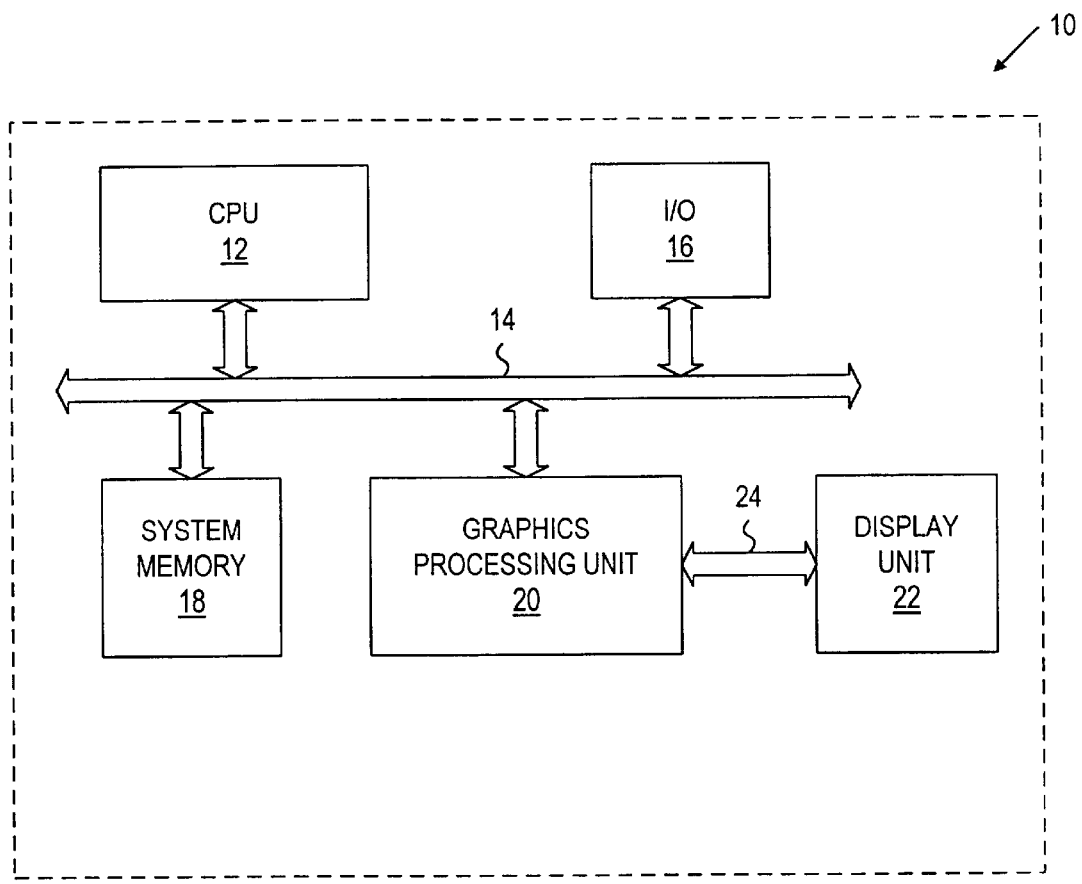
FIG. 1 is a generalized block diagram illustrating a computer graphics system that may be used to execute a process for generating animated graphical images of an exterior patch surface of a layer of material stretching over an animated underlying structure in accordance with the present invention.

FIG. 1 shows a generalized block diagram illustrating a computer graphics system at 10 that may be used to execute a process for generating animated graphical images of an exterior patch surface of an exterior layer of material stretching over an animated underlying structure in accordance with the present invention as further explained below. The computer graphics system 10 generally includes: a central processing unit (CPU) 12 communicatively coupled with a system bus 14; an input/output unit 16, a system memory unit 18, and a graphics processing unit 20 each being communicatively coupled with the CPU 12 via the system bus 14; and a display unit 22 communicatively coupled with the graphics processing unit 20 via an interface 24. In one embodiment, the system 10 is a computer graphics work station. In operation, the graphics processing unit 20 receives image display instructions and image data from clients such as the CPU via the system bus, and executes the instructions resulting in the generation of image data. The graphics processing unit 20 typically includes a 3D graphics pipeline (not shown) for generating data in the form of object descriptions. Object surfaces are formed by one or more primitive surfaces selected from different types of primitives including quadric surfaces, polygons, and parametric surfaces.

The process of the present invention may be used in conjunction with a 3D animation software tool executed by the computer graphics system 10. Examples of 3D animation software tools include Maya by Alias Wavefront which is a wholly owned subsidiary of Silicon Graphics, Inc., and RenderMan™ by Pixar. In one embodiment, important steps of the process of the present invention are implemented as a Maya plug-in, that is a software module compatible with Maya, comprising computer readable instructions for executing the process. In this embodiment, a graphics modeler may create animated images in accordance with the present invention using the Maya software tool package in conjunction with the exterior effect plug-in of the present invention. However, it will be understood by those skilled in the art that the process of the present invention may be implemented in accordance with any other 3D animation software tools. Also, it will be understood by those skilled in the art that the process of the present invention can also be implemented using hardware logic modules adapted to execute the steps further described below.

Figure 2:
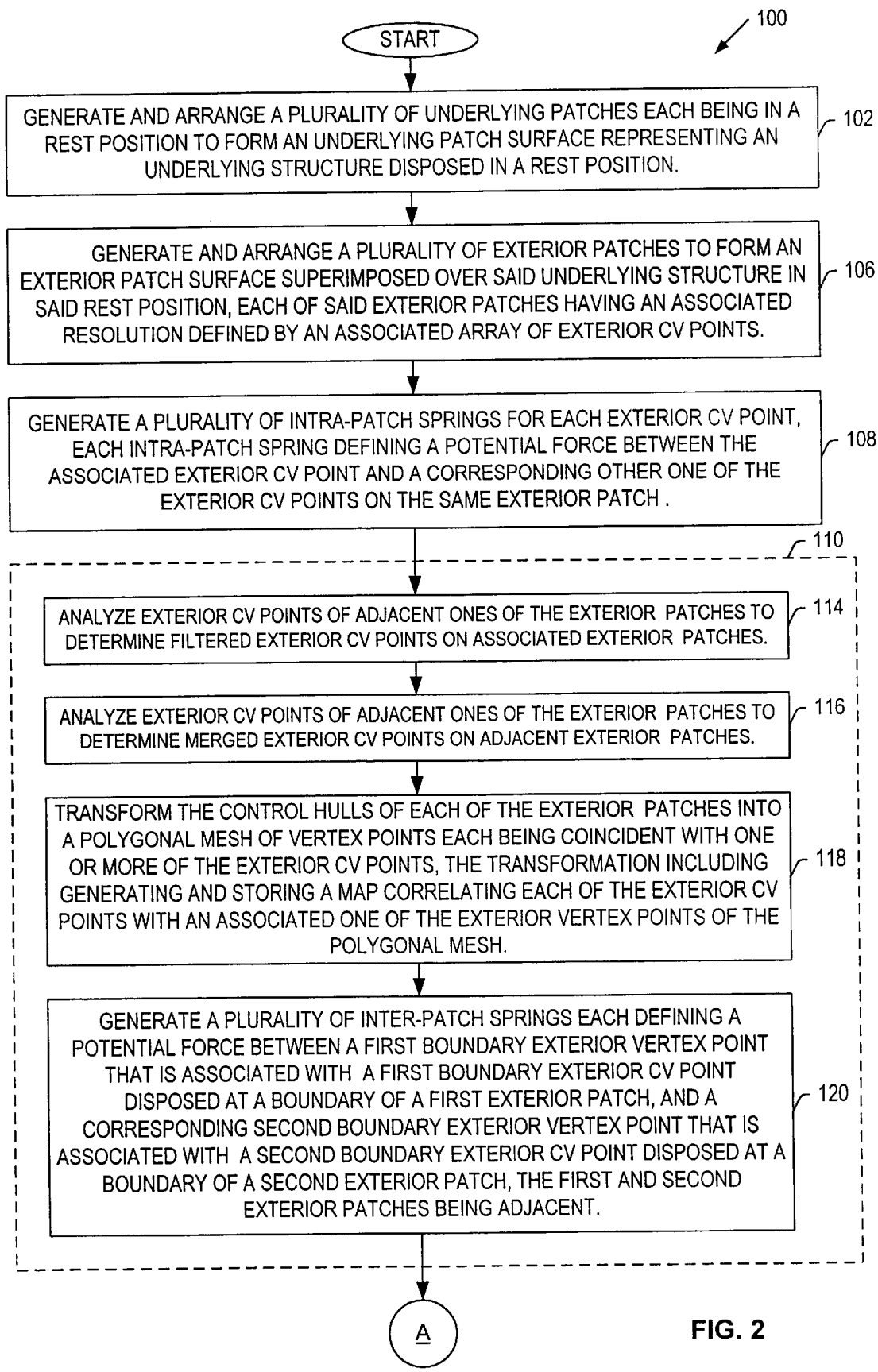
FIGS. 2 and 3 are flow diagrams generally illustrating the process in accordance with the present invention which includes a step of transforming control vertex (CV) points of each of a plurality of exterior patches into a polygonal mesh.

FIG. 2 shows a flow diagram generally illustrating a process at 100 for generating animated graphical images of an exterior patch surface of a layer of material stretching over an animated underlying structure. In a preferred embodiment of the present invention, the underlying structure is an anatomical structure of a human being or animal which may include skeleton objects, vasculature objects, ligament objects, muscle objects, and other tissue, and the exterior layer of material represents a layer of skin stretching over the underlying structure. Note however that the process may be used to generate animated graphical images of a layer of any type of material (e.g., cloth, plastic) stretching over any type of animated understructure. The process 100 is executed by an animation system in accordance with the present invention which may be implemented as computer readable instructions stored in the system memory 18 and executed by a processor of the computer graphics system 10 (FIG. 1).

The process 100 begins with a step 102 in which the animation system generates and arranges a plurality of underlying patches disposed in rest positions to form an underlying patch surface representing an underlying structure disposed in a rest position. Each of the underlying patches is defined by a parametric surface. In an embodiment, each of the underlying patches is generated as a non-uniform rational B-spine surface (NURBS) patch having an associated array, or "hull", of underlying control vertex (CV) points. In an alternative embodiment, each of the underlying patches may be generated as a cubic Bezier patch or any other suitable type of parametric surface primitive. A NURBS patch, which is basically a tensile product of two B-spines, provides a modeler with a high degree of flexibility that is required for representing highly detailed curved bodies. The underlying NURBS patches may be defined using a software tool such as MAYA or RenderMan.

The underlying surface generating step 102 may include scanning a subject (such as a human being, a vertebrate animal, or any other structure) while the subject is in a rest pose. In the embodiment wherein the subject is a person, the person's body is scanned while the person poses with outstretched arms. Scanning the subject yields plain cloud data including a number of points defining a model of the subject. Based on the proportions of the scanned topology, a modeler may create models of underlying elements using the scanned topology. An underlying NURBS patch surface representing the internal anatomy (e.g., a skeleton, musculature, vasculature, and ligaments) of the scanned subject may be constructed manually by a user based on the plain cloud data.

In step 106, the animation system generates and arranges a plurality of exterior patches to form an exterior patch surface representing an exterior layer of material superimposed over the underlying structure in the rest position, each of the exterior patches having an associated resolution defined by an associated array or hull of control points. In one embodiment, each of the exterior patches is generated as a NURBS patch having an associated resolution defined by an associated number of (CV) points. As for the underlying patch surface, the exterior patch surface may be generated based on the scan of the subject in the rest pose. The exterior NURBS patches may be generated automatically based on the scan and then edited by a modeler by reconfiguring the control hulls of the patches in accordance with a semi-manual process. The process of defining the control hull of a NURBS patch is referred to as parameterization and is well known. The CV points of a NURBS patch define a grid which need not be a uniform grid as discussed further below.

A modeler of the exterior patch surface may select a resolution for each patch based on the desired level of detail required to model the associated area of the subject. As an example, a modeler may desire to use a minimum number of CV points for patches used to define a large flat region of the body (e.g., the stomach area) in order to conserve the total number of CV points of the entire patch surface model for purposes of conserving the processing power required for executing animation processes as further explained below. The goal of the modeler is to maximize the image quality of the exterior patch surface while minimizing the processing power required by defining a large number of CV points for patches in areas requiring fine detail (e.g., a human face), and defining a small number of CV points for patches in areas that do not require fine detail.

A principle object of the exterior effect animation process of the present invention is to generate natural looking images of an exterior layer or material stretching over an animated understructure. As further explained below, a natural looking effect can be achieved by creating the appearance of elasticity in the exterior layer of material by defining "springs" between associated pairs of the exterior CV points in order to achieve the elasticity effect. Each of the springs is defined by a mathematical function representing a potential force that may be exerted between the associated pairs of exterior CV points as a function of the distance between them.

In step 108, the system generates a plurality of intra-patch springs for each exterior CV point of each of the exterior patches, each intra-patch spring defining a potential force between the associated exterior CV point and a corresponding other exterior CV point of the same exterior patch. The CV points of a NURBS patch surface define a grid which need not be a uniform grid as discussed further below.

A problem arises in defining springs between CV points of adjacent pairs of patches having different resolutions defined by a different number of CV points. If a modeler were limited to generating each of the NURBS to patches having the same resolution, that is the same number of CV points, then the above mentioned problem associated with defining springs between adjacent patches would not arise. However, for the reasons explained above, it is desirable to allow the modeler to model the exterior layer using NURBS patches having varying resolutions. Without careful analysis, filtering, and transformation as further explained below, defining springs between CV points of adjacent NURBS exterior patches having different resolutions would create problems of cracks, seams, and other undesirable artifacts. The problem lies in the fact that the lengths of the springs would vary depending on the layout of the adjacent patches, and the varying spring lengths would cause unwanted results during a relaxation phase of the animation process which includes resolving forces exerted by the springs as further explained below. In order to avoid these unwanted results, the process 100 includes a stitching process 110 for transforming the control hulls of the exterior NURBS patches into a polygonal mesh as further explained below.

From step 108, the system proceeds to execute the stitching sub-process 110. As further explained below, the object of the stitching sub-process 110 is to transform the CV points of the exterior NURBS patches into a polygonal mesh of vertex points each being coincident with at least one of the exterior CV points, at least one pair of the vertex points being associated with a spring defining a potential force there between. The stitching subprocess 110 begins with a step 114 in which the CV points of adjacent ones of the exterior patches are analyzed to determine filtered exterior CV points on the associated exterior patches. As mentioned above, the process provides for defining springs between selected ones of the exterior CV points for the purposes of achieving the elasticity effect. In general, the exterior CV points filtered out are spurious CV points for which it would be problematic to define springs. As described in detail below, the spurious CV points are CV points which deviate from a regular array of CV points on an associated patch. Note that the resulting polygonal mesh of exterior vertex points does not include the filtered exterior CV points.

From step 114, stitching sub-process 110 proceeds to step 116 in which the system analyzes CV points of adjacent exterior patches to determine merged CV points at adjacent edges of the adjacent exterior patches. Analysis of the CV points of adjacent exterior patches varies based on whether the adjacent patches have the same resolution. For a special case wherein the two adjacent NURBS patches have the same resolution, a simplified analysis is performed. In this simple case, the edges of all the NURBS patches are examined to determine merged exterior CV points which can be considered to be coincident as further explained below.

In accordance with a more general case wherein adjacent exterior NURBS patches have different resolutions, it is necessary to find edges of adjacent patches that may not have coincident points, but at least have points that are within a specified tolerance distance of each other. Each pair of merged CV points of adjacent patches is mapped to a common vertex point of the polygonal mesh during a transformation step 118. Algorithms for analyzing adjacent patches to determine merged points are further explained below in detail.

From step 114, stitching sub-process 110 proceeds to step 118 in which the system transforms the control hulls of each of the exterior patches into a polygonal mesh of vertex points each being coincident with one or more of the exterior CV points. The transformation includes generating and storing transformation mapping information correlating each of the exterior CV points with an associated one of the vertex points of the polygonal mesh as further explained below. The transformation step 118 also includes incorporating the intra-patch springs created in step 108 into the polygonal mesh so that vertex points associated with corresponding ones of the CV points are subject to the potential forces of the associated intra-patch springs. Further details of the transformation step 118 are explained below.

From step 118, stitching sub-process 110 proceeds to step 120 in which the system generates a plurality of inter-patch springs each defining a potential force between a first boundary exterior vertex point that is associated with a first boundary exterior CV point disposed proximate a boundary of a first exterior patch, and a second boundary exterior vertex point that is associated with a second boundary exterior CV point disposed proximate a boundary of a second exterior patch, wherein the first and second exterior patches are adjacent. Three different types of springs are defined to be associated with corresponding ones of the exterior vertex points. The springs include structural springs, shearing springs, and bending springs as further described below. Each of the springs is a mathematical function defining a potential force between the associated pair of vertex points as a function of the distance between the vertex points. Note that for each type of spring, a spring constant parameter is defined to specify the behavior of the spring as further described below.

The stitching sub-process 110 provides for merging the arrays of CV points of each of the exterior patches. Spurious CV points are filtered, and coincident CV points are merged as described above. However, information indicative of the filtered and merged CV points is stored along with the mapping information correlating each of the CV points with an associated one of the vertex points because eventually the NURBS patches must be reconstructed as further explained below.

The stitching sub-process 110 is just an intermediate sub-process required for executing relaxation functions as further explained below. Note that the stitching process 110 is performed only once to establish the integrated polygonal mesh of exterior vertex points. Note also that the mapping information generated and stored in the transformation step 118 is necessary because the exterior NURBS patches must be reconstructed subsequent to a relaxation phase of a deformation process performed on the polygonal mesh as further explained below. From step 120, the process 100 proceeds to "A" (to FIG. 3) to execute binding and deformation sub-processes on the polygonal mesh, and a reconstruction subprocess for creating NURBS patches based on the deformed mesh and the transformation mapping information.

Figure 3:
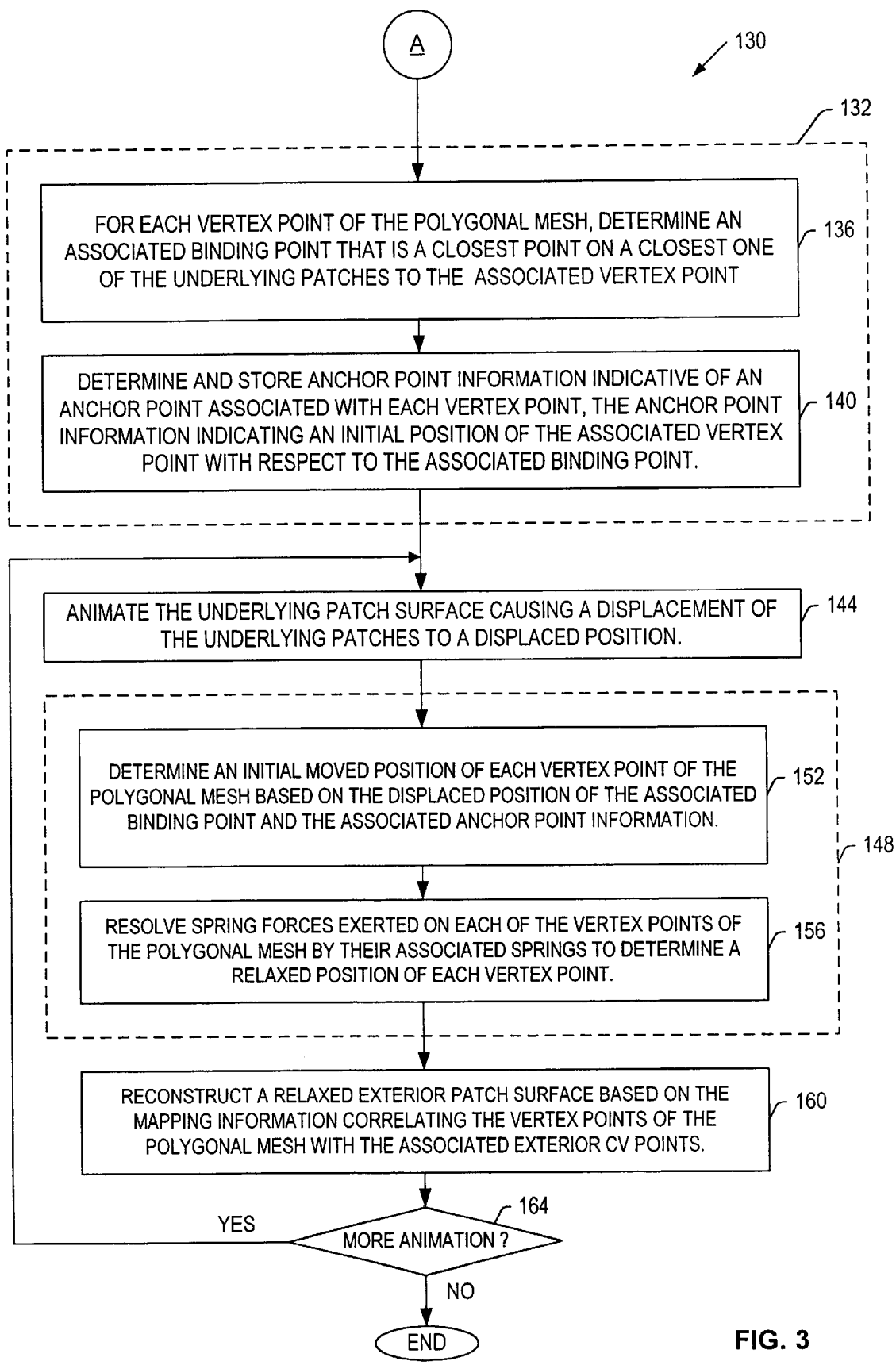

FIG. 3 shows a flow diagram generally illustrating further steps at 130 of the animation process 100 (FIG. 2). The process proceed from "A" (from FIG. 2) to execute a binding sub-process 132 for establishing a binding positional relationship between each of the vertex points of the polygonal mesh and an associated closest one of the underlying NURBS patches to the vertex point.

The binding sub-process 132 begins with a step 136 in which the system determines an associated binding point for each exterior vertex point of the polygonal mesh. The binding point is defined as the closest point on the surface of the closest one of the underlying patches to the associated vertex point. For each vertex point, an optimal algorithm is used for finding the associated binding point. In one embodiment, the plug-in utilizes a function that is provided in the library of the modeling program (e.g., Maya) for determining the closest point on the surface of the closest underlying patch. Further details of step 136 are described below.

From step 136, the binding sub-process 132 proceeds to step 140 in which the system determines anchor point information indicating an anchor point associated with each of the vertex points of the polygonal mesh. Each anchor point defines the location of the associated vertex point of the mesh relative to its associated binding point with the associated closest underlying patch being disposed in the rest position. The anchor point information essentially indicates the initial rest position of the vertex point relative to its associated binding point in the rest position.

As described above, each of the underlying patches is a NURBS patch having an associated (u,v) coordinate system defining a u-direction and a v-direction. As explained in further detail below, the anchor point associated with each of the vertex points is defined by: determining a normal vector that is normal to the surface of the associated closest underlying patch at the associated binding point; determining a u-tangent to the surface of the associated closest underlying patch along the u-direction at the associated binding point; determining a v-tangent to the surface of the associated closest underlying patch along the v direction at the associated binding point. The normal vector, the u-tangent, and the v-tangent define a binding point reference coordinate system for the associated anchor point. The position of the anchor point is defined relative to the binding point using the associated binding point reference coordinate system.

Note that the stitching sub-process 110 (FIG. 2) and the binding sub-process 132 (FIG. 3) are only performed once each to establish the polygonal mesh and the binding positional relationships between each of the vertex points of the polygonal mesh and the associated binding points.

In step 144, the system animates the underlying structure causing a displacement in the position of at least one of the underlying patches relative to the rest positions of the underlying patches. The animation step 144 results in a deformed underlying structure. Within the context of the depicted process, the animation step 144 is performed to generate an image of the underlying structure in a next frame of the animated graphical sequence. Animation of the underlying patch surface is executed in accordance with well-known techniques.

From step 144, the process proceeds to execute a deformation sub-process 148 which includes two phases: a movement phase and a relaxation phase. During the movement phase, the anchor point associated with each exterior vertex point is moved and the associated exterior vertex point is moved along with it. During the relaxation phase, the exterior vertex point can move from the anchor point in accordance with the forces exerted by the springs. Finally, the system resolves the spring forces exerted on each of the exterior vertex points of the polygonal mesh by their associated springs to determine a relaxed position of each exterior vertex point.

The deformation sub-process begins with a step 152 in which the system determines an initial moved position for each exterior vertex point of the polygonal mesh based on the displaced position of the associated binding point, as a result of the animation step 144, and the associated binding point positional information. In the preferred embodiment, the system determines the moved position for each of the vertex points based on the associated binding point, the associated anchor point, and a displacement in the position of the associated closest underlying patch as a result of the animation step 144. The moving of the vertex points causes a deformation of at least a portion of the springs of the mesh resulting in spring restoring forces being exerted on associated vertex points.

The movement step 152 includes moving all of the anchor points with respect to the underlying NURBS patches taking into account the changed orientation of the underlying patch and its position. In the preferred embodiment, the system determines the moved position for each of the vertex points by: reading the stored patch information and the binding point information associated with a particular one of the vertex points; determining a displaced reference coordinate system of the associated closest underlying patch by determining a displaced normal vector, a displaced u-tangent, and a displaced v-tangent to the surface of the associated closest underlying patch at the associated binding point with the closest underlying patch being in the displaced position relative to the associated rest position; reading the anchor point position information associated with the particular vertex point; and determining a moved position of the particular vertex point based on the anchor point position information and the displaced reference coordinate system. This moving step if explained in further detail below.

As explained above, springs are defined between selected ones of the exterior vertex points of the polygonal mesh, and adjusting the strength of the springs allows variations in the effective elasticity of the exterior topology. Note that the distance between the anchor point and its associated exterior vertex point is just a rigid distance that acts like a pin. There is no spring defined between the exterior vertex point and the anchor point or between the exterior vertex point and its associated binding point. Note also that the deformation process 148 is executed every time the position of the underlying patch surface is changed in accordance with the animation process.

After the exterior vertex points are moved to the initial positions in step 152 based on the displaced position of the association binding points and the associated anchor point information, the springs exert forces between the exterior vertex points. These spring forces are resolved in the relaxation step 156. The change in the distance between exterior vertex points as a result of the performance of the movement step 152 deforms the springs which results in a restoring force which tends to move the associated vertex points together. The relaxation step includes resolving this system of forces to an equilibrium state. The force exerted on each exterior vertex point is computed and each of the exterior vertex points is moved until a certain threshold of equilibrium is reached.

After execution of the deformation sub-process 148, the process proceeds to step 160 in which the system reconstructs a relaxed exterior patch surface based on the transformation mapping information generated in the transformation step 118 (FIG. 2) for correlating the exterior vertex points of the polygonal mesh with the associated CV points of associated exterior patches. For each exterior vertex point of the mesh, the transformation mapping information indicates the associated exterior NURBS patch, and coordinates defined in the coordinate space of the associated exterior patch indicating the associated CV point on the patch. The reconstruction step 160 is further explained below.

From step 160, the process proceeds to step 164 in which it is determined whether there are more animation frames to be processed and sequenced and if so, the process proceeds back to step 144 to animate the underlying patch surface causing a further displacement of the underlying patch to a further displaced position. If there are no more animation frames to process, the process 100 ends.

Figure 4:
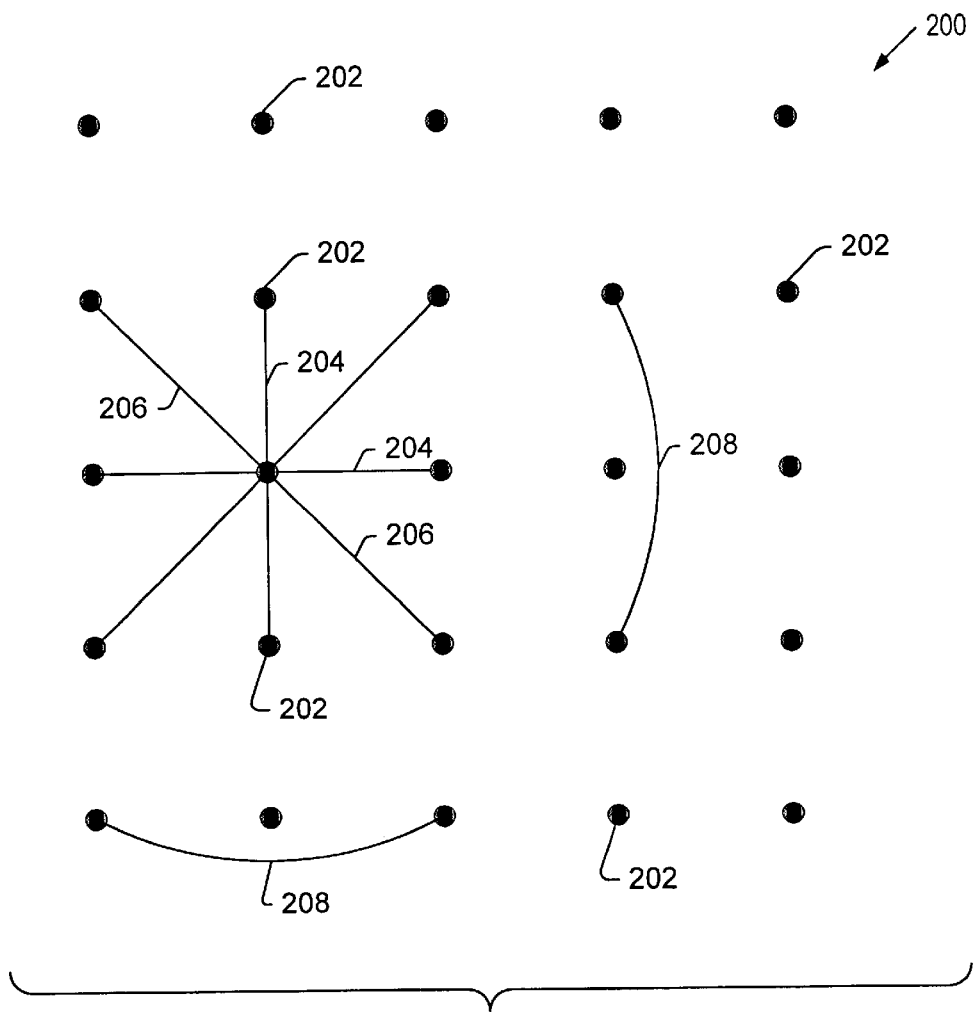
FIG. 4 is a block diagram generally illustrating different types of springs defining potential forces between CV points of a patch, the springs being incorporated into the polygonal mesh in accordance with the transforming step of the present invention.

FIG. 4 shows a block diagram generally illustrating an array at 200 of CV points of an exterior NURBS patch. Each of a plurality of associated pairs of the CV points includes a plurality of different types of intra-patch springs defining potential forces therebetween. In the depicted array 200, each of the exterior CV points is disposed within a substantially regular array of CV points. However, this is not the general case because CV points disposed proximate the patch boundary often deviate from the regular array positioning as further explained below. As mentioned above, the step 108 (FIG. 2) provides for defining at least one intra-patch spring between a corresponding pair of selected CV points of at least one of the exterior patches.

The intra-patch springs, as well as the inter-patch springs defined in step 120 (FIG. 2) as described above, include: structural, or stretching, springs 204 defining potential forces between associated pairs of adjacent CV points that are arranged vertically and horizontally within the regular array 200 of CV points; shearing springs 206 defining potential forces between associated pairs of adjacent CV points 202 that are arranged diagonally within the regular array 200 of CV points; and bending springs 208 defining potential forces between associated pairs of CV points 202 that are arranged vertically and horizontally and one point apart within the regular array of CV points. Each of the associated pairs of CV points 202 having bending springs 208 defined therebetween have at least one other CV point 202 disposed there between that is not subject to the associated bending spring.

The structural springs 204 define a stretching ability of the exterior layer of material. Note that higher spring coefficient values for the structural springs 204 will prevent the exterior layer from stretching, while lower spring coefficient values for the structural springs 204 facilitate stretching of the exterior layer. The shearing springs 206 prevent shearing of the exterior layer, that is keep the iso-parameters on the exterior layer of material orthogonal, during execution of the deformation sub-process 148 (FIG. 3). The bending springs 208 prevent bending of the exterior layer during execution of the deformation sub-process 148 (FIG. 3). Note that higher spring coefficient values for the bending springs 208 prevent the exterior layer from bending, while lower spring coefficient values for the bending springs 208 facilitate the appearance of wrinkles.

The springs 204, 206, and 208 are implemented as mathematical relationships defining potential forces between the associated vertex points. In one embodiment, each of the three spring types uses the same force function but has different coefficients. In one embodiment, the springs 204, 206, and 208 are defined automatically during the stitching process 110 (FIG. 2) by plug-in that is compatible with Maya. In this embodiment, the user of the Maya plug-in may edit the springs manually.

As mentioned above, the step 118 (FIG. 2) of transforming the control points into a polygonal mesh includes incorporating the intra-patch springs generated in step 108 (FIG. 2) into the polygonal mesh so that associated vertex points of the mesh (the vertex points coincident with CV points having intra-patch springs associated therewith) are subject to the potential force of the intra-patch springs.

Figure 5:
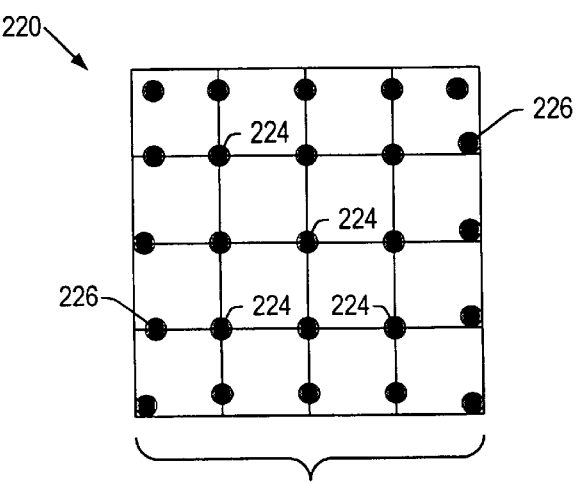
FIG. 5 is a block diagram generally illustrating a plurality of CV points of a NURBS patch, the CV points including CV points arranged in a substantially regular array, and spurious CV points disposed at locations deviating from the regular array.

FIG. 5 shows a block diagram generally illustrating a NURBS patch at 220 including a plurality of CV points having regular CV points 224 that are disposed in a substantially regular array, and spurious CV points 226 that are disposed at locations deviating from the regular array. As mentioned above, a problem arises in defining springs associated with the spurious CV points 226 because the lengths of springs associated with the spurious CV points 226 would vary with the deviation of the position of the spurious CV points from the regular array, and the varying spring lengths would cause unwanted results during the relaxation phase of the movement sub-process 148 (FIG. 3) which includes resolving forces exerted by the springs. In order to avoid these unwanted results, the process 100 provides the step 114 (FIG. 2) of filtering the spurious CV points. The filtering includes: analyzing the CV points of an exterior patch to determine spurious CV points by determining a substantially regular array of CV points formed by the positions of a portion of the CV points of the particular exterior patch, and determining the spurious control points as control points of the particular exterior patch that are disposed in locations deviating from the regular array beyond a threshold difference value; and filtering the spurious CV points during the step 118 (FIG. 2) of transforming the control hull of each of the exterior patches into a polygonal mesh so that none of the vertex points are coincident with any of the spurious control points. Note however that the transformation step 118 (FIG. 2) does provide for storing the positions of the spurious CV points as part of the transformation mapping information so that the spurious CV points may be transformed back to CV points during the reconstruction step 160 (FIG. 3) after performance of the binding and deformation processes performed on the polygonal mesh that does not include vertex points coincident with the spurious CV points.

In addition to the problems associated with defining springs for spurious CV points, another problem arises in defining springs between CV points of adjacent pairs of exterior patches having different resolutions defined by a different number of CV points. Without selective analysis, filtering, and transformation as further explained below, defining springs between CV points of adjacent NURBS exterior patches having different resolutions would create problems of cracks, seams, and other undesirable artifacts in the animated exterior layer of material. The problem lies in the fact that the lengths of the springs would vary depending on the layout of the adjacent patches, and the varying spring lengths would cause unwanted results during the relaxation phase of the movement sub-process 148 (FIG. 3) which includes resolving forces exerted by the springs. In order to avoid these unwanted results, the process 100 includes a stitching process for transforming the control hulls of the exterior NURBS patches into a polygonal mesh as further explained below.

Figure 6:
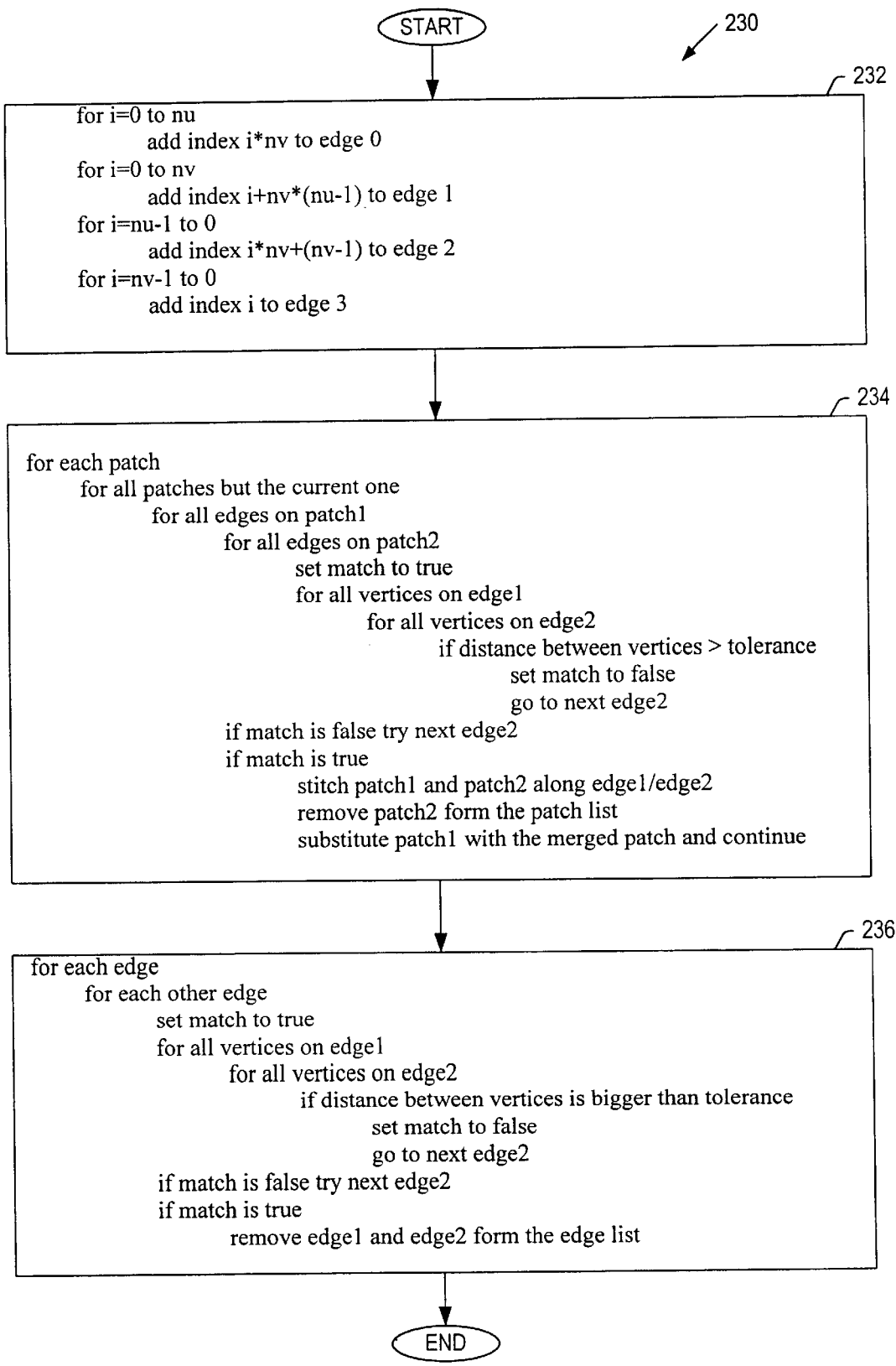
FIG. 6 is a flow diagram generally illustrating a process of determining merged CV points at adjacent edges of adjacent patches having the same resolution in accordance with the step of transforming the CV points of the patches into a polygonal mesh.

FIG. 6 shows a flow diagram generally illustrating a sub-process at 230 of the animation process of the present invention for determining merged CV points of exterior patches in accordance with step 116 (FIG. 2) for the case of adjacent exterior NURBS patches having the same resolution. As mentioned above, the exterior NURBS patches can have different resolutions and do not need to have aligned edges. The resulting mesh can be used for simulations like cloth or skin that require a spring mesh, or as a generating mesh for subdivision surfaces. The sub-process 230 provides for preserving all information necessary to reconstruct the original NURBS patches from the polygonal mesh.

Each patch is represented by an array of 3D points (the CVs), arranged as a rectangular grid of size nu×nv. The CV's are numbered from 0 to nu×nv−1, with the v index changing faster (i.e. 0,1 . . . nv,nv+1 . . . 2*nv−1,2*nv . . . nu*nv−1). Each edge of each patch is represented as an array of indices in a CV array.

The sub-process 230 begins with a step 232 which includes executing the depicted pseudo-code for creating an edge array of indices for each edge of each patch. In executing step 232 for a single patch, the system generates four edge arrays of indices, the indices of the four edge arrays being ordered sequentially in clock wise order so that the end index of each edge is a start index of the next edge.

In step 234, the system determines adjacent patches having the same resolution, that is patches that have an edge in common, and merges adjacent patches of the same resolution into a single mesh. The result of executing step 234 is that all adjacent patches of the same resolution are merged into a single mesh. However there may be internal edges that have not been merged. FIGS. 7A through 7D show block diagrams generally illustrating exemplary positional relationships between adjacent NURBS patches having the same resolution that are merged in accordance with step 234 (FIG. 6).

Figure 7A:
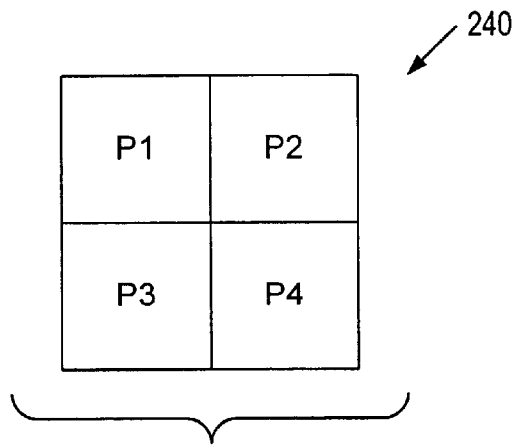
FIGS. 7A through 7D are block diagrams generally illustrating results of the process of merging adjacent edges of adjacent patches having the same resolution.
Figure 7B:
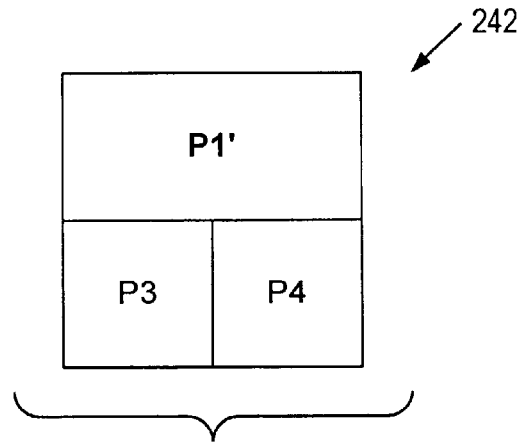
Figure 7C:
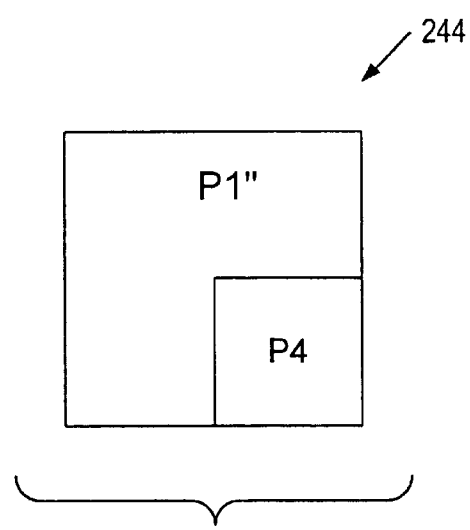
Figure 7D:
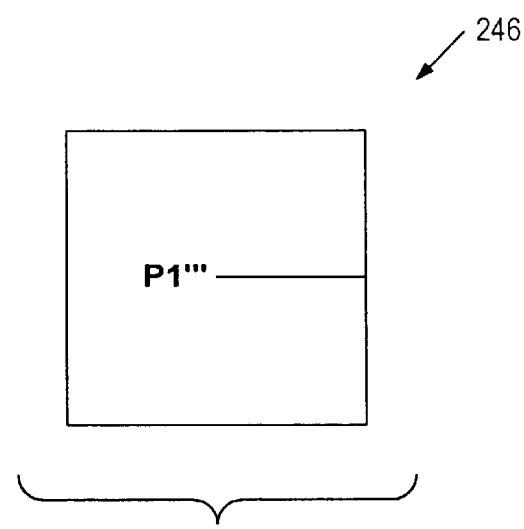

FIG. 7A shows a block diagram generally illustrating a portion of a patch surface at 240 including adjacent NURBS patches P1, P2, P3, and P4 having adjacent edges in common that may be merged together in accordance with the step 234 (FIG. 6) for the purpose of achieving the stitching function of the stitching sub-process 110 (FIG. 2). As a result of applying steps 232 and 234 (FIG. 6) to the patch surface 240, patches P1 and P2 are merged together. FIG. 7B shows a block diagram generally illustrating a patch surface at 242 including adjacent NURBS patches P1', P3, and P4 wherein patch P1' results from patches P1 and P2 (FIG. 7A) being merged together. As a result of applying steps 232 and 234 (FIG. 6) to the patch surface 242, patches P1' and P3 are merged together. FIG. 7C shows a block diagram generally illustrating a patch surface at 244 including adjacent NURBS patches P1" and P4 wherein patch P1" results from patches P1' and P3 (FIG. 7B) being merged together. As a result of executing steps 232 and 234 (FIG. 6), patches P1" and P4 are merged together. FIG. 7D shows a block diagram generally illustrating a NURBS patch P1''' at 246 having an internal edge, the patch P1''' resulting from patches P1" and P4 (FIG. 7C) being merged together. Referring back to FIG. 6, the process 230 proceeds from step 234 to step 236 in which the system executes the depicted pseudo-code for merging internal edges that have not been merged. As an example, the step 236 may be executed for merging the internal edge of the patch P1''' (FIG. 7D).

Figure 8A:
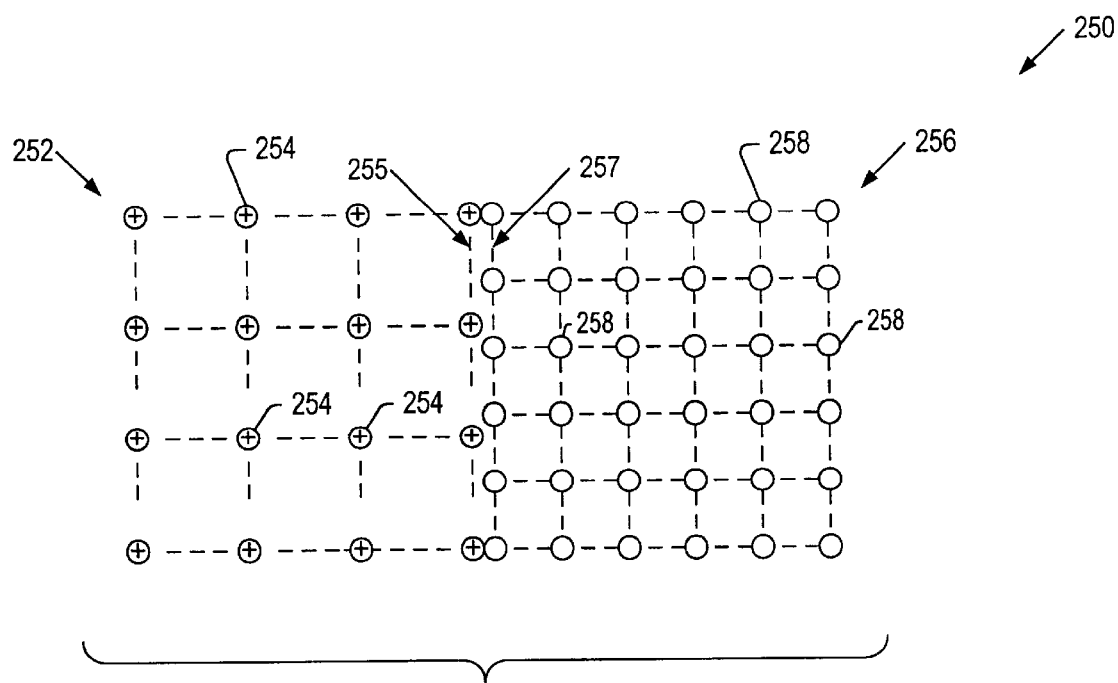
FIGS. 8A and 8B are block diagrams generally illustrating positional relationships between adjacent patches having varying resolutions.

FIG. 8A shows a block diagram generally illustrating positional relationships at 250 between adjacent patches having different resolutions. A first exterior patch 252 having a first resolution, defined by a 4×4 array of associated CV points 254, has an edge 255 that is adjacent an edge 257 of a second exterior patch 256 having a second resolution defined by a 6×6 array of associated CV points 258. At least a portion of the CV points 254 located proximate a medial portion of the edge 255 of the first patch 252 do not coincide with the CV points 258 located proximate the edge 257 of the second patch 256. In accordance with the merging and transformation steps 114 and 116 (FIG. 2), a predetermined maximum distance between CV points specifies a tolerance distance used for determining which CV points are to be merged, and accordingly, which patches are to be "stitched". If a particular one of the CV points 254 disposed proximate the medial portion of the edge 255 of the first patch 252 is determined to be located within the tolerance distance of an associated one of the CV points 258 of the second patch 256, then the particular CV point 254 and the associated one of the CV points 258 that is within the tolerance distance can be merged. A sub-process for determining whether CV points are within the specified tolerance distance is further described below.

Figure 8B:
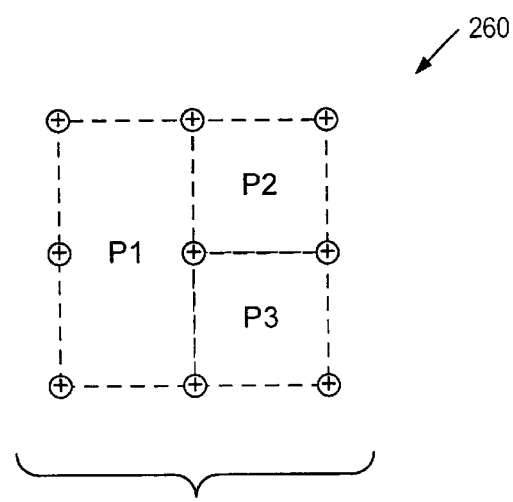

FIG. 8B shows a block diagram generally illustrating positional relationships at 260 between adjacent exterior patches having "split T-junction edges" which occurs when an edge of a first patch P1 is adjacent to edges of two other patches P2 and P3. In order to properly handle this case, the split T-junction edge of P1 is split into two edges that can be merged with the corresponding edges of P2 and P3 as further explained below.

Figure 9A:
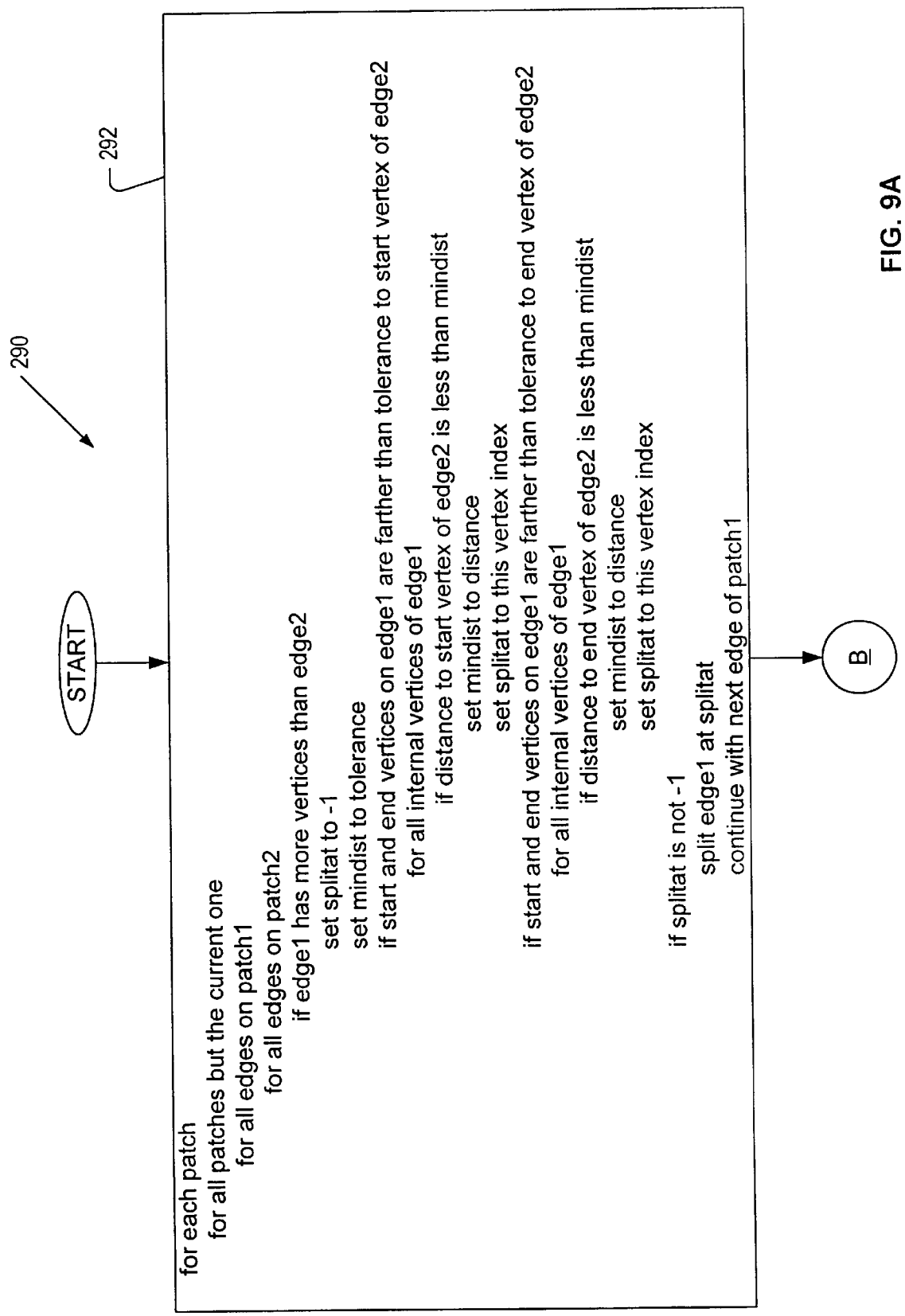
FIGS. 9A and 9B are flow diagrams generally illustrating a process of determining merged CV points along adjacent edges of adjacent patches having varying resolutions in accordance with the step of transforming the CV points of the patches into a polygonal mesh.

FIG. 9A shows a flow diagram generally illustrating a process at 290 for determining merged CV points at adjacent edges of the adjacent patches having varying resolutions in accordance with the step 118 (FIG. 2) of transforming the CV points of the patches into a polygonal mesh. Each of the illustrated steps of the process 290 is expressed in pseudo-code as further explained below. Note that the terms "CV points" and "vertexes" may be used interchangeably in the context of this pseudo code because the CV points are transformed into vertex points of the mesh during the transformation step. The process 290 begins with a step 292 in which the system: examines the edges of all of the exterior patches generated in step 106 (FIG. 2); determines all T-junction edges which occurs when an edge of a first patch P1 is adjacent to edges of two other patches P2 and P3 as shown at 260 in FIG. 8B; and splits each of the T-junction edges into two separate edges for purposes of determining CV points along selected edges to be merged in accordance with steps further described below. From step 292, the depicted process proceeds to "B" (to FIG. 9B).

Figure 9B:
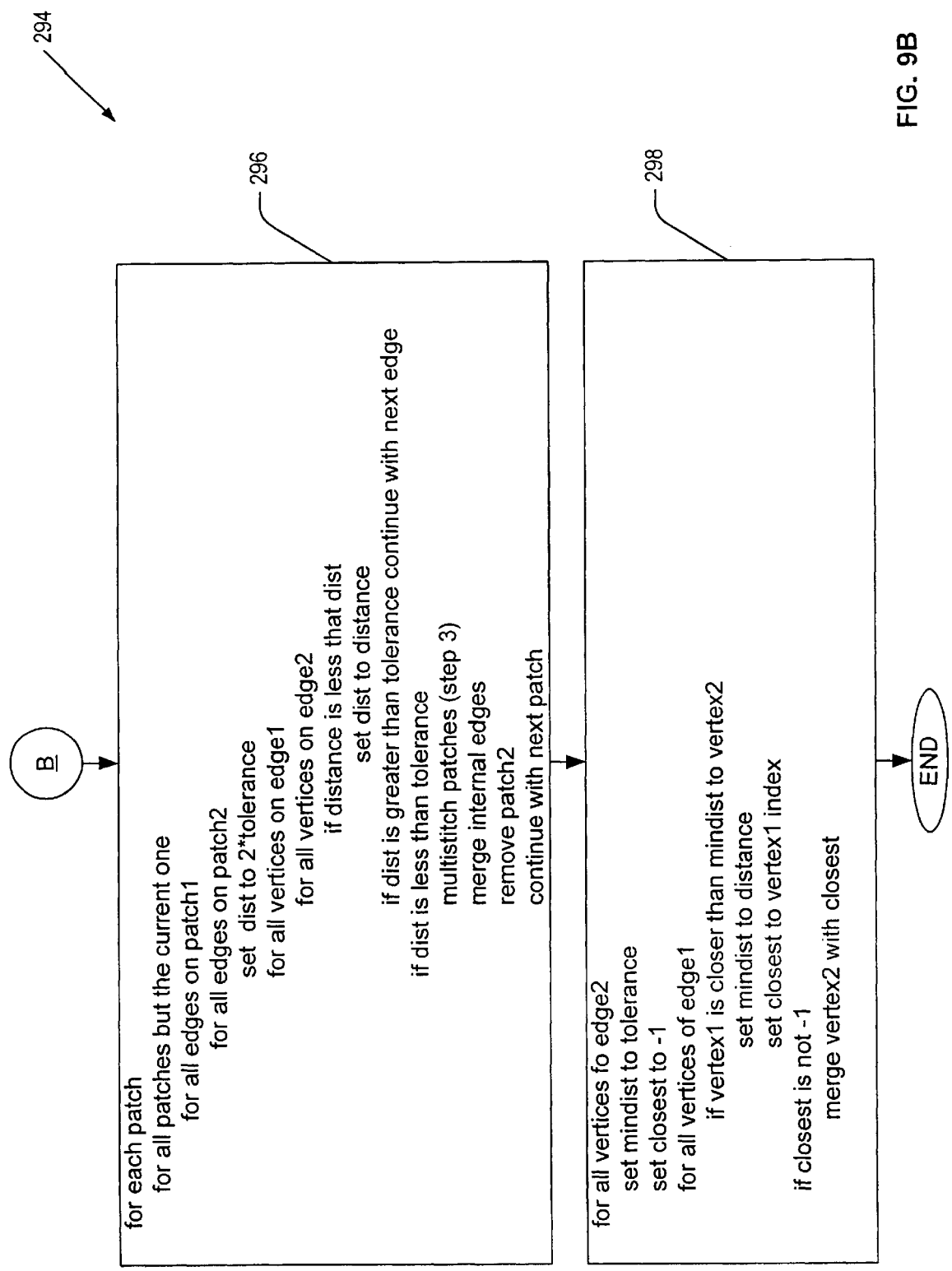

FIG. 9B shows a flow diagram generally illustrating furither steps of the process 290 (FIG. 9A) for determining merged CV points along adjacent edges of adjacent patches. The process proceeds from "B" (from FIG. 9A) to step 296 in which the animation system: examines each CV point along each edge of each patch to determine an associated closest CV point disposed proximate an associated adjacent edge of an associated adjacent patch; and determines for each edge whether all CV points disposed along the edge and their associated closest CV point along the associated adjacent edge of the associated adjacent patch are located within the specified tolerance distance.

As an example of operation of the system in step 296, referring back to FIG. 8A, for each CV point 254 along the edge 255 of the first patch 252, the system determines the distance to an associated closest one of the CV points 258 that is disposed proximate the edge 257 of the second patch 256. The system then determines whether the distance between each of the CV points 254 disposed along the edge 255 and it's associated closest CV point along the associated adjacent edge 257 is within the specified tolerance distance.

In step 298, for each edge, if the distance between each of the CV points 254 disposed along the edge 255 and it's associated closest CV point 258 disposed along the associated adjacent edge 257 is within the specified tolerance distance, the system merges each of the CV points 254 disposed along the edge 255 with it's associated closest CV point along the associated adjacent edge 257. If the distance between each of the CV points 254 disposed along the edge 255 and it's associated closest CV point 258 along the associated adjacent edge 257 is not within the specified tolerance distance, the system does not merge any of the CV points 254 disposed along the edge 255. "Merging" a pair of the CV points of adjacent patches refers to mapping each of the pair of the CV points to a single one of the vertex points of the polygonal mesh in step 118 (FIG. 2).

Figure 10:
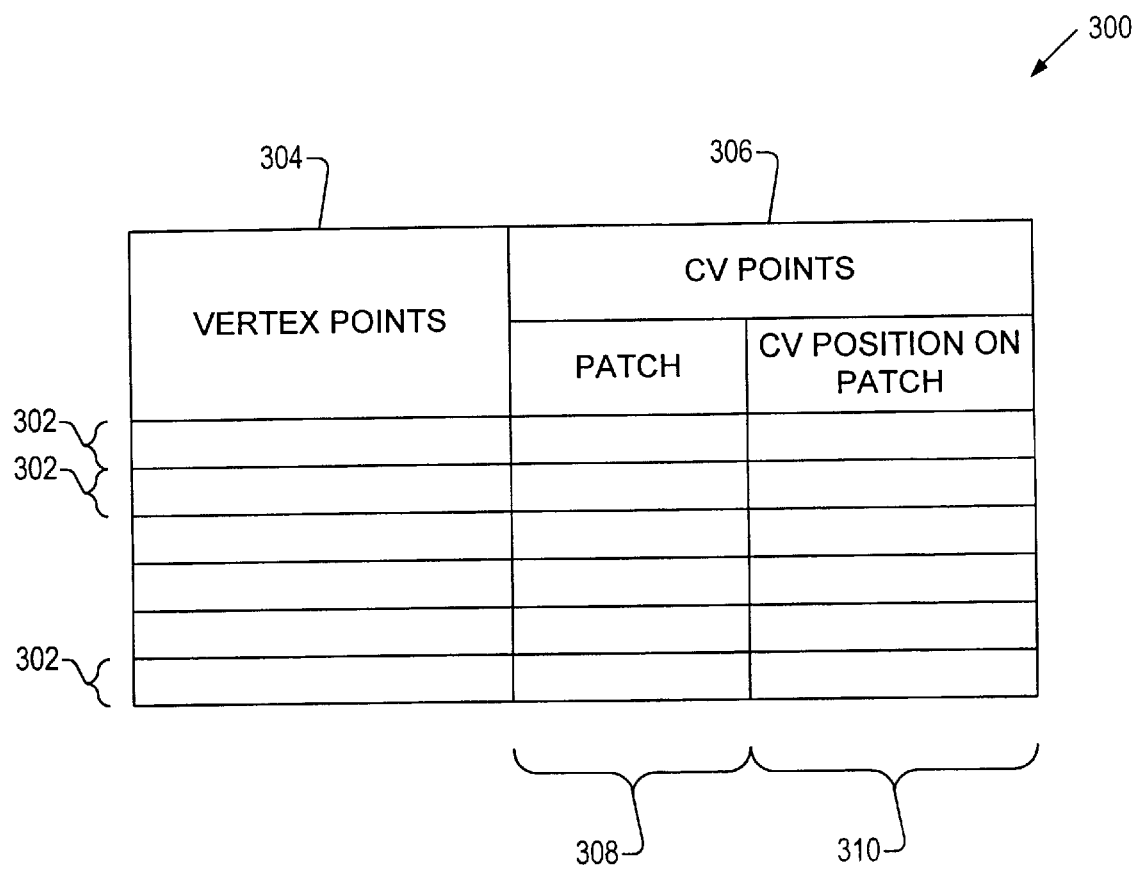
FIG. 10 is a table diagram generally illustrating transformation mapping information generated during the step of transforming CV points of each of a plurality of patches into a polygonal mesh.

FIG. 10 shows a table diagram generally illustrating transformation mapping information at 300 generated during the step 118 (FIG. 2) of transforming CV points of each of a plurality of patches into a polygonal mesh. The transformation mapping information 300 includes: a plurality of map entries 302 each having: vertex point information 304 indicating an associated vertex point of the polygonal mesh; and associated CV point information 306 indicating an associated CV point of an associated one of the exterior NURBS patches that maps to the associated vertex point of the polygonal mesh in accordance with the transformation of patches to a polygonal mesh. The CV point information 306 includes patch information 308 indicating the exterior NURBS patch associated with the vertex point, and CV point information 310 indicating the position of the associated CV point on the associated exterior NURBS patch. The transformation mapping information 300 is generated and stored in system memory 18 (FIG. 1) during the transformation step 118 (FIG. 2), and read from system memory during the patch reconstruction step 160 (FIG. 3) for the purpose of reconstructing exterior NURBS patches based on the deformed polygonal mesh that results from executing the steps of binding, moving, and relaxing the polygonal mesh with the animated understructure.

FIG. 11 shows a perspective view at 330 of a pair of adjacent exterior CV patches disposed proximate an associated closest underlying patch, the view illustrating binding positional relationships between vertex points of the polygonal mesh and the associated closest underlying patch. As described above, each of the patches is a NURBS patch having a (u,v) coordinate system defining a u-direction and a v-direction relative to the NURBS patch. The diagram illustrates the relationship between an anchor point, associated with an exterior vertex point of the polygonal mesh, and its associated binding point which is the closest point on the surface of the closest one of the underlying NURBS patches.

A first exterior NURBS patch 332 is disposed adjacent a second exterior NURBS patch 334. At least a portion of the surface of the second exterior NURBS patch 334 is disposed over an underlying NURBS patch 336. It is assumed that the patches 332, 334, and 336 are disposed in rest positions as described above. Assume that a first CV point of the first exterior NURBS patch 332 is mapped to an associated first vertex point having an associated first anchor point 338, each of the first CV point, first vertex point, and first anchor point 338 being coincident in the rest position. The first anchor point 338 has an associated first binding point 340 which is the closest point on the surface of the closest underlying NURBS patch 336. Assume also that a second CV point of the second exterior NURBS patch 334 is mapped to an associated second vertex point having an associated second anchor point 342, each of the second CV point, second vertex point, and second anchor point 342 being coincident in the rest position. The second anchor point 342 has an associated second binding point 344 which is the closest point on the surface of the closest underlying NURBS patch 336.

A first normal vector 346 is normal to the surface of the underlying patch 336 at the first binding point 340, and a second normal vector 348 is normal to the surface of the underlying patch 336 at the second binding point 344. A first u-tangent 350 to the surface of the underlying patch 336 is defined at the first binding point 340, and a second u-tangent 352 to the surface of the underlying patch 336 is defined at the second binding point 344. In the depicted example, the first and second u-tangents 350 and 352 are co-linear. However, this is just a special case. A first v-tangent 356 to the surface of the underlying patch 336 is tangent to the first binding point 340, and a second v-tangent 358 is tangent to the surface of the underlying patch 336 at the second binding point 344. In one embodiment, each of the normal vectors 346, 348 is defined in world space which is independent of each of the (u, v) coordinate systems of the NURBS patches 332, 334, and 346.

As described above, the step 140 (FIG. 3) of determining an anchor point associated with each of the vertex points includes: determining a normal vector 346, 348 that is normal to the surface of the associated closest underlying patch 336 at the associated binding point 340, 344; determining a u-tangent 350, 352 to the surface of the associated closest underlying patch 336 along the u-direction at the associated binding point 340, 344; and determining a v-tangent 356, 358 to the surface of the associated closest underlying patch 336 along the v-direction at the associated binding point. The normal vector 346, 348, the u-tangent 350, 352, and the v-tangent 356, 358 define a three-value binding point reference coordinate system (X=Δu, Y=Δv, distance d along normal vector) for the associated anchor point 338, 342. The final part of the step 140 (FIG. 3) of determining an anchor point includes defining the position of the anchor point relative to the binding point using the binding point reference coordinate system defined for the associated anchor point as described above. Note that for the second anchor point 342 which overlies the surface of the underlying patch 336, the position of the anchor point 342 relative to its associated binding point 344 may be defined as (X=Δu=0, Y=Δv=0, d) using the associated binding point reference coordinate system defined for the associated anchor point because Δu=0, and Y=Δv=0 for the second anchor point 342 which overlies the surface of the underlying patch 336. The distance d between the anchor point and binding point corresponds to the thickness of the exterior layer of material.

However, for the first anchor point 338 which does not overly the surface of the underlying patch 336, the position of the anchor point 338 relative to its associated binding point 340 may be defined as (X=Δu shown at 362, Y=Δv=0, d) using the associated binding point reference coordinate system defined for the associated anchor point.

In the embodiment of the present invention wherein the exterior layer is a layer of skin stretching over an underlying anatomical structure, the distance 360, 364 along the normal vector 346, 348 between the binding point 340, 344 and the associated anchor point 338, 342 corresponds to a layer of fat of the skin.

FIG. 12 shows a table diagram generally illustrating binding positional mapping information at 400 generated based on the binding positional relationships determined between vertex points of the polygonal mesh and associated closest underlying patches. As explained above, the step 140 (FIG. 3) of establishing a binding positional relationship includes generating and storing anchor point mapping information associated with each of the exterior vertex points.

The binding positional mapping information 400 includes a plurality of vertex point entries 402 each having: vertex point information 404 indicating an associated vertex point of the polygonal mesh; and associated binding positional information 406 indicating an associated anchor point and binding point mapping to the associated vertex point of the polygonal mesh. The binding positional information 406 includes patch information 408 indicating the closest underlying NURBS patch to the associated vertex point, binding point position information 410 indicating the (u, v) position of the associated binding point on the associated closest underlying NURBS patch; and anchor point position information 412 having coordinates indicating the position of the associated anchor point relative to the associated binding point using the (x, y, z) binding point reference coordinate system defined for the associated anchor point as described above.

The binding positional mapping information 400 is generated and stored in system memory 18 (FIG. 1) during execution of the binding sub-process 132 (FIG. 3), and read from system memory during the movement step 152 (FIG. 3) for moving each of the vertex points of the polygonal mesh based on the associated binding positional relationship for the purpose of establishing an initial position of the vertex points of the polygonal mesh during the deformation sub-process 140 (FIG. 3).

Note that the (x, y, z) binding point reference coordinate system defined for each of the anchor points must be re-calculated upon every frame of the animation process during the movement step 152 (FIG. 3) as the position of the associated closest underlying patch is translated. The step 152 (FIG. 3) of moving each of the vertex points based on the associated binding positional relationship includes: reading the patch information 408 and the binding point information 410 associated with a particular one of the vertex points 402; determining a displaced binding point reference coordinate system for the associated anchor point by determining a displaced normal vector, a displaced u-tangent, and a displaced v-tangent to the surface of the associated closest underlying patch at the associated binding point with the closest underlying patch being in the displaced position relative to the associated rest position; reading the anchor point position information 412 associated with the particular vertex point; and determining a moved position of the particular vertex point based on the anchor point position information 412 and the displaced binding point reference coordinate system.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A process for generating animated graphical images of an exterior patch surface of an exterior layer disposed over an animated underlying structure comprising the steps of:

generating and arranging a plurality of underlying patches each being in a rest position to form an underlying patch surface representing an underlying structure disposed in a rest position;

generating and arranging a plurality of exterior patches to form an exterior patch surface superimposed over said underlying structure in said rest position, each of said exterior patches having an associated array of control points;

transforming said control points of said exterior patches into a polygonal mesh of vertex points each being coincident with at least one of said control points;

establishing a binding positional relationship between each of said vertex points and an associated closest one of said underlying patches to said vertex point;

animating said underlying structure causing a displacement in the position of at least one of said underlying patches relative to said rest positions of said underlying patches, and resulting in a deformed underlying structure; and moving at least a portion of said vertex points based on said associated binding positional relationships and displacements in the positions of said underlying patches.

2. A process for generating animated graphical images as recited in claim 1 further comprising the step of generating a plurality of deformed exterior patches each having an array of control points at least some of which are coincident with moved positions of associated ones of said vertex points of said polygonal mesh, said deformed exterior patches defining a deformed exterior patch surface superimposed over said deformed underlying structure.

3. A process for generating animated graphical images as recited in claim 1 wherein said step of establishing a binding positional relationship between each of said vertex points and said associated closest underlying patch in said rest position further comprises:

determining a binding point associated with each of said vertex points, each said binding point being located at a closest point to said associated vertex point on the surface of said associated closest underlying patch; and determining an anchor point associated with each of said vertex points, each said anchor point defining the location of said associated vertex point relative to its associated binding point with said associated closest underlying patch being disposed in said rest position.

4. A process for generating animated graphical images as recited in claim 3 wherein said step of moving each of said vertex points based on said binding positional relationships further comprises determining a moved position for each of said vertex points based on said associated binding point, said associated anchor point, and a displacement in the position of said associated closest underlying patch.

5. A process for generating animated graphical images as recited in claim 3 wherein each of said underlying patches is a non-uniform rational B-spline (NURBS) patch having a (u,v) coordinate system defining a u-direction and a v-direction relative to said NURBS patch, and wherein said step of determining an anchor point associated with each of said vertex points further comprises:

determining a normal vector that is normal to the surface of said associated closest underlying patch at said associated binding point;

determining a u-tangent to the surface of said associated closest underlying patch along the u-direction at said associated binding point;

determining a v-tangent to the surface of said associated closest underlying patch along the v-direction at said associated binding point, said normal vector, said u-tangent, and said v-tangent defining an associated binding point reference coordinate system for said associated anchor point; and defining the position of said anchor point relative to said binding point using said associated binding point reference coordinate system.

6. A process for generating animated graphical images as recited in claim 5 wherein said normal vector is defined in world space.

7. A process for generating animated graphical images as recited in claim 5 wherein said step of establishing a binding positional relationship further comprises the step of generating and storing anchor point mapping information associated with each of said exterior vertex points, said anchor point mapping information including:

patch information indicative of said associated closest underlying patch;

binding point information indicative of said associated binding point; and anchor point position information indicative of the position of said anchor point relative to said binding point in terms of said associated binding point reference coordinate system.

8. A process for generating animated graphical images as recited in claim 7 wherein said step of moving each of said vertex points based on said associated binding positional relationship comprises:

reading said patch information and said binding point information associated with a particular one of said vertex points;

determining a displaced binding point reference coordinate system for said associated anchor point by determining a displaced normal vector, a displaced u-tangent, and a displaced v-tangent to the surface of said associated closest underlying patch at said associated binding point with said closest underlying patch being in said displaced position relative to said associated rest position;

reading said anchor point position information associated with said particular vertex point; and determining a moved position of said particular vertex point based on said anchor point position information and said displaced binding point reference coordinate system.

9. A process for generating animated graphical images as recited in claim 1 wherein:

said step of transforming said control points into a polygonal mesh further includes defining at least one spring between a corresponding pair of said vertex points, each said spring defining a potential force between said corresponding pair of vertex points; and said step of moving at least a portion of said vertex points includes, deforming at least a portion of said springs resulting in spring restoring forces being exerted on associated vertex points, and computing and resolving said spring restoring forces to determine a relaxed position for each of said vertex points of said polygonal mesh.

10. A process for generating animated graphical images as recited in claim 9 wherein each of said vertex points is disposed within a substantially regular array of vertex points, and wherein each of said springs is selected from a group of spring types comprising:

a structural spring defining a potential force between an associated pair of adjacent vertex points that are arranged either vertically or horizontally within the regular array of vertex points;

a shearing spring defining a potential force between an associated pair of adjacent vertex points that are arranged diagonally within the regular array of vertex points; and a bending spring defining a potential force between an associated pair of vertex points that are arranged either vertically or horizontally within the regular array of vertex points, the associated pair of vertex points having a bending spring defined therebetween and also having at least one other vertex point disposed there between.

11. A process for generating animated graphical images as recited in claim 1 further comprising the steps of:

defining at least one intra-patch spring between a corresponding pair of selected control points of at least one of said exterior patches, each said intra-patch spring defining a potential force between said corresponding pair of selected control points;

wherein said step of transforming said control points into a polygonal mesh includes incorporating said at least one intra-patch spring into said polygonal mesh so that a pair of vertex points each being coincident with a corresponding one of said pair of selected control points is subject to the potential force of said intra-patch spring.

12. A process for generating animated graphical images as recited in claim 1 wherein said step of transforming said control points into a polygonal mesh further comprises defining at least one inter-patch spring between a corresponding pair of boundary vertex points each being coincident with at least one boundary control point of an associated one of an adjacent pair of said exterior patches, each said inter-patch spring defining a potential force between said corresponding pair of boundary vertex points.

13. A process for generating animated graphical images as recited in claim 1 wherein said step of transforming said control points into a polygonal mesh comprises:

analyzing said control points of a particular one of said exterior patches to determine spurious control points by determining a substantially regular array of points formed by a portion of the control points of said particular exterior patch, and determining said spurious control points as control points of said particular exterior patch that are disposed in locations deviating from said regular array beyond a threshold difference value; and filtering said spurious control points during said step of transforming said control hull of each of said exterior patches into a polygonal mesh so that none of said vertex points are coincident with any of said spurious control points.

14. A process for generating animated graphical images as recited in claim 1 wherein said underlying structure is an anatomical structure, and wherein said exterior layer is a skin layer stretching over said anatomical structure.

15. A process for generating animated graphical images as recited in claim 5 wherein said underlying structure is an anatomical structure, and wherein said exterior layer is a skin layer representing skin stretching over said anatomical structure, and wherein the distance along said normal vector between said binding point and said associated anchor point corresponds to a layer of fat of said skin.

16. A process for generating animated graphical images as recited in claim 2 wherein:

said step of transforming said control points into a polygonal mesh of vertex points includes generating and storing mapping information correlating each of said control points with an associated one of said vertex points; and said step of generating a plurality of deformed exterior patches includes reading said mapping information.

17. A process for generating animated graphical images as recited in claim 1 wherein said step of transforming said control points into a polygonal mesh of vertex points further comprises:

analyzing control points of an adjacent pair of said exterior patches to determine a pair of merged control points; and generating and storing mapping information correlating each of said control points with an associated one of said vertex points, said mapping information correlating each of said pair of merged control points to a common one of said vertex points.

18. A process for generating animated graphical images as recited in claim 1 wherein at least a portion of said exterior patches have varying resolutions defined by the number of control points in said associated arrays.

19. A process for generating animated graphical images as recited in claim 18 wherein said step of transforming said control points into a polygonal mesh of vertex points further comprises:

analyzing control points of an adjacent pair of said exterior patches to determine a pair of merged control points; and generating and storing mapping information correlating each of said control points with an associated one of said vertex points, said mapping information correlating each of said pair of merged control points to a common one of said vertex points.

20. A process for generating animated graphical images as recited in claim 19 wherein said step of analyzing control points of an adjacent pair of said exterior patches comprises determining whether said adjacent pair of exterior patches have different resolutions.

21. A process for generating animated graphical images as recited in claim 19 wherein said pair of merged control points are coincident control points disposed along adjacent edges of said adjacent patches.

22. A process for generating animated graphical images as recited in claim 19 wherein said pair of merged control points are control points of said adjacent patches that are located within a specified tolerance distance to each other, and wherein said mapping information correlates each of said pair of merged control points to a vertex point that is coincident with a selected one of said pair of merged control points.

23. A process for generating animated graphical images of an exterior patch surface of an exterior layer of material stretching over an underlying structure comprising the steps of:

generating and arranging a plurality of underlying patches each being in a rest position to form an underlying patch surface representing an underlying structure disposed in a rest position;

generating and arranging a plurality of exterior patches to form an exterior patch surface superimposed over said underlying structure in said rest position, each of said exterior patches having an associated array of control points;

transforming said control points of said exterior patches into a polygonal mesh of vertex points each being coincident with at least one of said control points, at least one pair of said vertex points being associated with a spring defining a potential force therebetween;

establishing a binding positional relationship between each of said vertex points and an associated closest one of said underlying patches to said vertex point;

animating said underlying structure causing a displacement in the position of at least one of said underlying patches relative to said rest positions of said underlying patches, and resulting in a deformed underlying structure;

moving at least a portion of said vertex points based on said associated binding positional relationships and displacements in the positions of said associated closest underlying patches, said moving of said vertex points deforming at least a portion of said springs resulting in spring restoring forces being exerted on associated vertex points;

computing and resolving said spring restoring forces to determine a relaxed position for each of said vertex points of said polygonal mesh; and generating a plurality of deformed exterior patches each having an array of control points at least some of which are coincident with relaxed positions of associated ones of said vertex points of said polygonal mesh, said reconstructed exterior patches defining a deformed exterior patch surface superimposed over said deformed underlying structure.

24. A process for generating animated graphical images as recited in claim 23 wherein said step of establishing a binding positional relationship between each of said vertex points and said associated closest underlying patch in said rest position further comprises:

determining a binding point associated with each of said vertex points, each said binding point being located at a closest point to said associated vertex point on the surface of said associated closest underlying patch; and determining an anchor point associated with each of said vertex points, each said anchor point defining the location of said associated vertex point relative to its associated binding point with said associated closest underlying patch being disposed in said rest position.

25. A process for generating animated graphical images as recited in claim 24 wherein said step of moving each of said vertex points based on said binding positional relationships further comprises determining a moved position for each of said vertex points based on said associated binding point, said associated anchor point, and a displacement in the position of said associated closest underlying patch.

26. A process for generating animated graphical images as recited in claim 24 wherein each of said underlying patches is a non-uniform rational B-spline (NURBS) patch having a (u,v) coordinate system defining a u-direction and a v-direction relative to said NURBS patch, and wherein said step of determining an anchor point associated with each of said vertex points further comprises:

determining a normal vector that is normal to the surface of said associated closest underlying patch at said associated binding point;

determining a u-tangent to the surface of said associated closest underlying patch along the u-direction at said associated binding point;

determining a v-tangent to the surface of said associated closest underlying patch along the v-direction at said associated binding point, said normal vector, said u-tangent, and said v-tangent defining an associated binding point reference coordinate system for said associated anchor point; and defining the position of said anchor point relative to said binding point using said associated binding point reference coordinate system.

27. A process for generating animated graphical images as recited in claim 26 wherein said normal vector is defined in world space.

28. A process for generating animated graphical images as recited in claim 26 wherein said step of establishing a binding positional relationship further comprises the step of generating and storing anchor point mapping information associated with each of said exterior vertex points, said anchor point mapping information including:

patch information indicative of said associated closest underlying patch;

binding point information indicative of said associated binding point; and anchor point position information indicative of the position of said anchor point relative to said binding point and relative to said binding point reference coordinate system.

29. A process for generating animated graphical images as recited in claim 28 wherein said step of moving each of said vertex points based on said associated binding positional relationship comprises:

reading said patch information and said binding point information associated with a particular one of said vertex points;

determining a displaced binding point reference coordinate system defined for said associated anchor point by determining a displaced normal vector, a displaced u-tangent, and a displaced v-tangent to the surface of said associated closest underlying patch at said associated binding point with said closest underlying patch being in said displaced position relative to said associated rest position;

reading said anchor point position information associated with said particular vertex point; and determining a moved position of said particular vertex point based on said anchor point position information and said displaced binding point reference coordinate system.

30. A process for generating animated graphical images as recited in claim 23 wherein each of said vertex points is disposed within a substantially regular array of vertex points, and wherein each of said springs is selected from a group of spring types comprising:

a structural spring defining a potential force between an associated pair of adjacent vertex points that are arranged either vertically or horizontally within the regular array of vertex points;

a shearing spring defining a potential force between an associated pair of adjacent vertex points that are arranged diagonally within the regular array of vertex points; and a bending spring defining a potential force between an associated pair of vertex points that are arranged either vertically or horizontally within the regular array of vertex points, the associated pair of vertex points having a bending spring defined therebetween and also having at least one other vertex point disposed there between.

31. A process for generating animated graphical images as recited in claim 23 further comprising the steps of:

defining at least one intra-patch spring between a corresponding pair of selected control points of at least one of said exterior patches, each said intra-patch spring defining a potential force between said corresponding pair of selected control points;

wherein said step of transforming said control points into a polygonal mesh includes incorporating said at least one intra-patch spring into said polygonal mesh so that a pair of vertex points each being coincident with a corresponding one of said pair of selected control points is subject to the potential force of said intra-patch spring.

32. A process for generating animated graphical images as recited in claim 23 wherein said step of transforming said control points into a polygonal mesh further comprises defining at least one inter-patch spring between a corresponding pair of boundary vertex points each being coincident with at least one boundary control point of an associated one of an adjacent pair of said exterior patches, each said inter-patch spring defining a potential force between said corresponding pair of boundary vertex points.

33. A process for generating animated graphical images as recited in claim 23 wherein said step of transforming said control points into a polygonal mesh comprises:

analyzing said control points of a particular one of said exterior patches to determine spurious control points by determining a substantially regular array of points formed by a portion of the control points of said particular exterior patch, and determining said spurious control points as control points of said particular exterior patch that are disposed in locations deviating from said regular array beyond a threshold difference value; and filtering said spurious control points during said step of transforming said control hull of each of said exterior patches into a polygonal mesh so that none of said vertex points are coincident with any of said spurious control points.

34. A process for generating animated graphical images as recited in claim 23 wherein said underlying structure is an anatomical structure, and wherein said exterior layer is a skin layer stretching over said anatomical structure.

35. A process for generating animated graphical images as recited in claim 26 wherein said underlying structure is an anatomical structure, and wherein said exterior layer is a skin layer representing skin stretching over said anatomical structure, and wherein the distance along said normal vector between said binding point and said associated anchor point corresponds to a layer of fat of said skin.

36. A process for generating animated graphical images as recited in claim 23 wherein:
   said step of transforming said control points into a polygonal mesh of vertex points includes generating and storing mapping information correlating each of said control points with an associated one of said vertex points; and
   said step of generating a plurality of deformed exterior patches includes reading said mapping information.

37. A process for generating animated graphical images as recited in claim 23 wherein at least a portion of said exterior patches have varying resolutions defined by the number of control points in said associated arrays.

38. A process for generating animated graphical images as recited in claim 37 wherein said step of transforming said control points into a polygonal mesh of vertex points further comprises:
   analyzing control points of an adjacent pair of said exterior patches to determine a pair of merged control points; and
   generating and storing mapping information correlating each of said control points with an associated one of said vertex points, said mapping information correlating each of said pair of merged control points to a common one of said vertex points.

39. A process for generating animated graphical images as recited in claim 38 wherein said step of analyzing control points of an adjacent pair of said exterior patches comprises determining whether said adjacent pair of exterior patches have different resolutions.

40. A process for generating animated graphical images as recited in claim 38 wherein said pair of merged control points are coincident control points disposed proximate adjacent edges of said adjacent patches.

41. A process for generating animated graphical images as recited in claim 38 wherein said pair of merged control points are control points of said adjacent patches that are located within a specified tolerance distance of each other, and wherein said mapping information correlates each of said pair of merged control points to a vertex point that is coincident with a selected one of said pair of merged control points.

42. A machine readable storage device having stored therein encoding instructions for executing a process of generating animated graphical images of an exterior patch surface of an exterior layer of material stretching over an underlying structure, the process comprising the steps of:
   generating and arranging a plurality of underlying patches each being in a rest position to form an underlying patch surface representing an underlying structure disposed in a rest position;
   generating and arranging a plurality of exterior patches to form an exterior patch surface superimposed over said underlying structure in said rest position, each of said exterior patches having an associated array of control points;
   transforming said control points of said exterior patches into a polygonal mesh of vertex points each being coincident with at least one of said control points, at least one pair of said vertex points being associated with a spring defining a potential force therebetween;
   establishing a binding positional relationship between each of said vertex points and an associated closest one of said underlying patches to said vertex point;
   animating said underlying structure causing a displacement in the position of at least one of said underlying patches relative to said rest positions of said underlying patches, and resulting in a deformed underlying structure;
   moving at least a portion of said vertex points based on said associated binding positional relationships and displacements in the positions of said associated closest underlying patches, said moving of said vertex points deforming at least a portion of said springs resulting in spring restoring forces being exerted on associated vertex points;
   computing and resolving said spring restoring forces to determine a relaxed position for each of said vertex points of said polygonal mesh; and
   generating a plurality of deformed exterior patches each having an array of control points at least some of which are coincident with relaxed positions of associated ones of said vertex points of said polygonal mesh, said reconstructed exterior patches defining a deformed exterior patch surface superimposed over said deformed underlying structure.

43. A machine readable storage device as recited in claim 42 wherein said step of establishing a binding positional relationship between each of said vertex points and said associated closest underlying patch in said rest position further comprises:
   determining a binding point associated with each of said vertex points, each said binding point being located at a closest point to said associated vertex point on the surface of said associated closest underlying patch; and
   determining an anchor point associated with each of said vertex points, each said anchor point defining the location of said associated vertex point relative to its associated binding point with said associated closest underlying patch being disposed in said rest position.

44. A machine readable storage device as recited in claim 43 wherein said step of moving each of said vertex points based on said binding positional relationships further comprises determining a moved position for each of said vertex points based on said associated binding point, said associated anchor point, and a displacement in the position of said associated closest underlying patch.

45. A machine readable storage device as recited in claim 43 wherein each of said underlying patches is a non-uniform rational B-spline (NURBS) patch having a (u,v) coordinate system defining a u-direction and a v-direction relative to said NURBS patch, and wherein said step of determining an anchor point associated with each of said vertex points further comprises:
   determining a normal vector that is normal to the surface of said associated closest underlying patch at said associated binding point;
   determining a u-tangent to the surface of said associated closest underlying patch along the u-direction at said associated binding point;
   determining a v-tangent to the surface of said associated closest underlying patch along the v-direction at said associated binding point, said normal vector, said u-tangent, and said v-tangent defining an associated binding point reference coordinate system for said associated anchor point; and
   defining the position of said anchor point relative to said binding point using said associated binding point reference coordinate system.

46. A machine readable storage device as recited in claim 45 wherein said normal vector is defined in world space.

47. A machine readable storage device as recited in claim 45 wherein said step of establishing a binding positional relationship further comprises the step of generating and storing anchor point mapping information associated with each of said exterior vertex points, said anchor point mapping information including:

- patch information indicative of said associated closest underlying patch;
- binding point information indicative of said associated binding point; and
- anchor point position information indicative of the position of said anchor point relative to said binding point in terms of said associated binding point reference coordinate system.

48. A machine readable storage device as recited in claim 47 wherein said step of moving each of said vertex points based on said associated binding positional relationship comprises:

- reading said patch information and said binding point information associated with a particular one of said vertex points;
- determining a displaced binding point reference coordinate system defined for said associated anchor point by determining a displaced normal vector, a displaced u-tangent, and a displaced v-tangent to the surface of said associated closest underlying patch at said associated binding point with said closest underlying patch being in said displaced position relative to said associated rest position;
- reading said anchor point position information associated with said particular vertex point; and
- determining a moved position of said particular vertex point based on said anchor point position information and said displaced binding point reference coordinate system.

49. A machine readable storage device as recited in claim 42 further comprising the steps of:

- defining at least one intra-patch spring between a corresponding pair of selected control points of at least one of said exterior patches, each said intra-patch spring defining a potential force between said corresponding pair of selected control points;
- wherein said step of transforming said control points into a polygonal mesh includes incorporating said at least one intra-patch spring into said polygonal mesh so that a pair of vertex points each being coincident with a corresponding one of said pair of selected control points is subject to the potential force of said intra-patch spring.

50. A machine readable storage device as recited in claim 42 wherein said step of transforming said control points into a polygonal mesh further comprises defining at least one inter-patch spring between a corresponding pair of boundary vertex points each being coincident with at least one boundary control point of an associated one of an adjacent pair of said exterior patches, each said inter-patch spring defining a potential force between said corresponding pair of boundary vertex points.

51. A machine readable storage device as recited in claim 42 wherein said step of transforming said control points into a polygonal mesh comprises:

- analyzing said control points of a particular one of said exterior patches to determine spurious control points by determining a substantially regular array of points formed by a portion of the control points of said particular exterior patch, and determining said spurious control points as control points of said particular exterior patch that are disposed in locations deviating from said regular array beyond a threshold difference value; and
- filtering said spurious control points during said step of transforming said control hull of each of said exterior patches into a polygonal mesh so that none of said vertex points are coincident with any of said spurious control points.

52. A machine readable storage device as recited in claim 42 wherein said underlying structure is an anatomical structure, and wherein said exterior layer is a skin layer stretching over said anatomical structure.

53. A machine readable storage device as recited in claim 42 wherein:

- said step of transforming said control points into a polygonal mesh of vertex points includes generating and storing mapping information correlating each of said control points with an associated one of said vertex points; and
- said step of generating a plurality of deformed exterior patches includes reading said mapping information.

54. A machine readable storage device as recited in claim 42 wherein at least a portion of said exterior patches have varying resolutions defined by the number of control points in said associated arrays.

55. A system for executing a process of generating animated graphical images of an exterior patch surface of an exterior layer of material stretching over an underlying structure, comprising:

- means for generating and arranging a plurality of underlying patches each being in a rest position to form an underlying patch surface representing an underlying structure disposed in a rest position;
- means for generating and arranging a plurality of exterior patches to form an exterior patch surface superimposed over said underlying structure in said rest position, each of said exterior patches having an associated array of control points;
- means for transforming said control points of said exterior patches into a polygonal mesh of vertex points each being coincident with at least one of said control points, at least one pair of said vertex points being associated with a spring defining a potential force therebetween;
- means for establishing a binding positional relationship between each of said vertex points and an associated closest one of said underlying patches to said vertex point;
- means for animating said underlying structure causing a displacement in the position of at least one of said underlying patches relative to said rest positions of said underlying patches, and resulting in a deformed underlying structure;
- means for moving at least a portion of said vertex points based on said associated binding positional relationships and displacements in the positions of said associated closest underlying patches, said moving of said vertex points deforming at least a portion of said springs resulting in spring restoring forces being exerted on associated vertex points;
- means for determining and resolving said spring restoring forces to determine a relaxed position for each of said vertex points of said polygonal mesh; and
- means for generating a plurality of deformed exterior patches each having an array of control points at least some of which are coincident with relaxed positions of associated ones of said vertex points of said polygonal mesh, said reconstructed exterior patches defining a deformed exterior patch surface superimposed over said deformed underlying structure.

56. A system as recited in claim 55 wherein said means for establishing a binding positional relationship between each of said vertex points and said associated closest underlying patch in said rest position further comprises:

means for determining a binding point associated with each of said vertex points, each said binding point being located at a closest point to said associated vertex point on the surface of said associated closest underlying patch; and means for determining an anchor point associated with each of said vertex points, each said anchor point defining the location of said associated vertex point relative to its associated binding point with said associated closest underlying patch being disposed in said rest position.

57. A system as recited in claim 56 wherein said means for moving each of said vertex points based on said binding positional relationships further comprises means for determining a moved position for each of said vertex points based on said associated binding point, said associated anchor point, and a displacement in the position of said associated closest underlying patch.

58. A system as recited in claim 56 wherein each of said underlying patches is a non-uniform rational B-spline (NURBS) patch having a (u,v) coordinate system defining a u-direction and a v-direction relative to said NURBS patch, and wherein said means for determining an anchor point associated with each of said vertex points further comprises:

means for determining a normal vector that is normal to the surface of said associated closest underlying patch at said associated binding point;

means for determining a u-tangent to the surface of said associated closest underlying patch along the u-direction at said associated binding point;

means for determining a v-tangent to the surface of said associated closest underlying patch along the v-direction at said associated binding point, said normal vector, said u-tangent, and said v-tangent defining an associated binding point reference coordinate system for said associated anchor point; and means for defining the position of said anchor point relative to said binding point using said associated binding point reference coordinate system.

\* \* \* \* \*